United States Patent
Klimov et al.

(10) Patent No.: US 12,066,741 B2
(45) Date of Patent: Aug. 20, 2024

(54) PHOTONIC AC-DC EQUIVALENCE CONVERTER AND PERFORMING AC-DC EQUIVALENCE CONVERSION

(71) Applicant: Government of the United States of America, as represented by the Secretary of Commerce, Gaithersburg, MD (US)

(72) Inventors: Nikolai Nikolaevich Klimov, Ellicott City, MD (US); Joseph Arthur Schneemeyer Hagmann, Falls Church, VA (US); Stefan Cular, Gaithersburg, MD (US); Thomas Eller Lipe, Jr., Richfield, NC (US)

(73) Assignee: GOVERNMENT OF THE UNITED STATES OF AMERICA, AS REPRESENTED BY THE SECRETARY OF COMMERCE, Gaithersburg, MD (US)

( * ) Notice: Subject to any disclaimer, the term of this patent is extended or adjusted under 35 U.S.C. 154(b) by 383 days.

(21) Appl. No.: 17/486,852

(22) Filed: Sep. 27, 2021

(65) Prior Publication Data
US 2022/0179285 A1    Jun. 9, 2022

Related U.S. Application Data

(60) Provisional application No. 63/083,218, filed on Sep. 25, 2020.

(51) Int. Cl.
| | |
|---|---|
| *H03M 1/00* | (2006.01) |
| *G02F 7/00* | (2006.01) |
| *H02M 11/00* | (2006.01) |

(52) U.S. Cl.
CPC ............... *G02F 7/00* (2013.01); *H02M 11/00* (2013.01)

(58) Field of Classification Search
CPC .................................. G02F 7/00; H02M 11/00
See application file for complete search history.

(56) References Cited

U.S. PATENT DOCUMENTS

| | | | |
|---|---|---|---|
| 5,393,351 A | 2/1995 | Kinard et al. | |
| 6,921,195 B2 * | 7/2005 | Pipe ........................ | G01K 3/00 374/45 |
| 7,636,522 B2 * | 12/2009 | Nagarajan ............ | H04B 10/506 398/79 |
| 8,798,414 B2 | 8/2014 | Quan et al. | |

(Continued)

OTHER PUBLICATIONS

Purdy, T.P., et al., "Quantum correlations from a room-temperature optomechanical cavity" Science, 2017, p. 1265-1268, vol. 356.

(Continued)

*Primary Examiner* — Jean B Jeanglaude
(74) *Attorney, Agent, or Firm* — Office of Chief Counsel for National Institute of Standards and Technology

(57) ABSTRACT

A photonic AC-DC voltage and current equivalence converter includes: a photonic chip; a weak thermal link; an isothermal region; a resistive electrode; an isothermal region photonic nanoresonator; an isothermal region waveguide; a chip photonic nanoresonator; and a chip waveguide, such that an ac voltage is determined from matching a temperature rise of the isothermal region due to a primary elevated temperature of the isothermal region when ac voltage is received by the resistive electrode.

20 Claims, 30 Drawing Sheets

(56) References Cited

U.S. PATENT DOCUMENTS

| | | | |
|---|---|---|---|
| 9,726,553 B2 | 8/2017 | Ahmed et al. | |
| 10,955,617 B2 | 3/2021 | Klimov et al. | |
| 2003/0152132 A1* | 8/2003 | Pipe | G01K 3/00 374/E3.001 |
| 2005/0207469 A1* | 9/2005 | Pipe | G01K 3/00 374/E3.001 |

OTHER PUBLICATIONS

Katzmann, F.L., et al., "AC-DC Thermal Converter with Infrared-Transmissive Fiber Coupling", IEEE Transactions on Instrumentation and Measurement, 1999, p. 415-417, vol. 48 No. 2.

Castelli, F., "The Infrared Thermal Converter as a Highly Precise Transfer Standard", IEEE Instrumentation and Measurement Technology Conference and IMEKO, 1996, p. 206-213.

Katzmann, F.L., et al., "A New Optically Sensed Thermal Element for Precise AC-DC Conversion", IEEE Transactions on Instruments and Measurements, 1993, p. 191-194, vol. 42 No. 2.

Lipe, T.E., et al., "New High-Frequency MJTCs of Novel Design on Fused Silica Substrates", 2012 Conference on Precision Electromagnetic Measurments, IEEE, 2012, p. 434-435.

\* cited by examiner (A)

(B)

PHOTONIC AC-DC EQUIVALENCE CONVERTER AND PERFORMING AC-DC EQUIVALENCE CONVERSION

CROSS REFERENCE TO RELATED APPLICATIONS

The application claims priority to U.S. Provisional Patent Application Ser. No. 63/083,218 filed Sep. 25, 2020, the disclosure of which is incorporated herein by reference in its entirety.

STATEMENT REGARDING FEDERALLY SPONSORED RESEARCH

This invention was made with United States Government support from the National Institute of Standards and Technology (NIST), an agency of the United States Department of Commerce.

BRIEF DESCRIPTION

Disclosed is a photonic ac-dc voltage and current equivalence converter for performing ac-dc voltage and current equivalence conversion, the photonic ac-dc voltage and current equivalence converter comprising: a photonic chip; a weak thermal link disposed on and in mechanical communication with the photonic chip; a isothermal region disposed on the weak thermal link an in mechanical communication with the weak thermal link, the isothermal region comprising: an isothermal substrate, an isothermal membrane, an isothermal obelisk disposed on either isothermal substrate, or on the isothermal membrane; when isothermal region comprised of isothermal membrane, the weak thermal link mechanically suspends the isothermal region from the photonic chip; the weak thermal link comprised of the following elements interposed between the isothermal region and the photonic chip: isolation trenches, an isolation membrane, isolation tether; an weak thermal link interposed between the isothermal region and the photonic chip, such that the isothermal region is thermally isolated from the photonic chip; a resistive electrode disposed on the isothermal region and in thermal communication with the isothermal region and that receives dc voltage, resistively heats to a primary elevated temperature in response to the dc voltage, receives ac voltage non-contemporaneously with the dc voltage, resistively heats to a test elevated temperature in response to the ac voltage, and heats the isothermal region via heat transfer from the resistive electrode to the isothermal region based on the primary elevated temperature and the test elevated temperature of the high resistivity electrode; an isothermal region photonic nanoresonator disposed on the isothermal region and comprising a first photonic resonance from which a temperature of the isothermal region is determinable and that varies with temperature of the isothermal region and that receives an isothermal region temperature probe light from an isothermal region waveguide; the isothermal region waveguide disposed on the isothermal region in optical communication with the isothermal region photonic nanoresonator and that communicates the isothermal region temperature probe light to the isothermal region photonic nanoresonator and that monitors transmission and storage of the isothermal region temperature probe light by the isothermal region photonic nanoresonator to determine the temperature of the isothermal region; a chip photonic nanoresonator disposed on the photonic chip and in thermal communication with the photonic chip and comprising a second photonic resonance from which a temperature of the photonic chip is determinable and that varies with temperature of the photonic chip and that receives a chip temperature probe light from a chip waveguide; and the chip waveguide disposed on the photonic chip in optical communication with the chip photonic nanoresonator and that communicates the chip temperature probe light to the chip photonic nanoresonator and that monitors transmission and storage of the chip temperature probe light by the chip photonic nanoresonator to determine the temperature of the isothermal region, such that the ac voltage is determined from matching a temperature rise of the isothermal region due to the primary elevated temperature of the isothermal region when the ac voltage is received by the resistive electrode.

Disclosed is a photonic ac-dc voltage and current equivalence converter for performing ac-dc voltage equivalence conversion, the photonic ac-dc voltage equivalence converter comprising: a photonic chip; a weak thermal link disposed on and in mechanical communication with the photonic chip; an isothermal region disposed on the weak thermal link an in mechanical communication with the weak thermal link; an isothermal region can be comprised of the combination of the following elements: an isothermal substrate, an isothermal membrane, an isothermal obelisk disposed on either isothermal substrate, or on the isothermal membrane; when isothermal region comprised of isothermal membrane, the weak thermal link mechanically suspends the isothermal region from the photonic chip; the weak thermal link comprised of the following elements interposed between the isothermal region and the photonic chip: isolation trenches, an isolation membrane, isolation tether; an weak thermal link interposed between the isothermal region and the photonic chip, such that the isothermal region is thermally isolated from the photonic chip; a resistive electrode disposed on the isothermal region and in thermal communication with the isothermal region and that receives dc voltage, resistively heats to a primary elevated temperature in response to the dc voltage, receives ac voltage non-contemporaneously with the dc voltage, resistively heats to a test elevated temperature in response to the ac voltage, and heats the membrane via heat transfer from the high resistivity electrode to the membrane based on the primary elevated temperature and the test elevated temperature of the high resistivity electrode; a first primary photonic quantum temperature standard disposed on the isothermal region and in mechanical communication with the isothermal region such that an averaged mean square amplitude of the thermally driven mechanical oscillations of the first primary photonic quantum temperature standard is directly related to the temperature of the isothermal region and from which the temperature of the isothermal region is determinable, wherein the amplitude varies with temperature of the isothermal region and is measured with isothermal region temperature probe light from the first primary photonic quantum temperature standard; a second primary photonic quantum temperature standard disposed on the photonic chip and in thermal communication with the photonic chip such that an averaged mean square amplitude of the thermally driven mechanical oscillations of the second primary photonic quantum temperature standard is directly related to the temperature of the photonic chip and from which the temperature of the photonic chip is determinable, wherein the amplitude varies with temperature of the photonic chip and is measured with the second primary photonic quantum temperature standard, such that the ac voltage is determined from matching a temperature rise of the membrane due to the primary elevated temperature of the membrane when the ac voltage is received by the resistive electrode.

Disclosed is a photonic ac-dc voltage and current equivalence converter for performing ac-dc voltage equivalence conversion, the photonic ac-dc voltage equivalence converter comprising: a photonic chip; a weak thermal link disposed on and in mechanical communication with the photonic chip; an isothermal region disposed on the weak thermal link an in mechanical communication with the weak thermal link; an isothermal region can be comprised of the combination of the following elements: an isothermal substrate, an isothermal membrane, an isothermal obelisk disposed on either isothermal substrate, or on the isothermal membrane; when isothermal region comprised of isothermal membrane, the weak thermal link mechanically suspends the isothermal region from the photonic chip; the weak thermal link comprised of the following elements interposed between the isothermal region and the photonic chip: isolation trenches, an isolation membrane, isolation tether; an weak thermal link interposed between the isothermal region and the photonic chip, such that the isothermal region is thermally isolated from the photonic chip; resistive electrode disposed on the isothermal region and in thermal communication with the isothermal region and that receives dc voltage, resistively heats to a primary elevated temperature in response to the dc voltage, receives ac voltage non-contemporaneously with the dc voltage, resistively heats to a test elevated temperature in response to the ac voltage, and heats the isothermal region via heat transfer from the high resistivity electrode to the isothermal region based on the primary elevated temperature and the test elevated temperature of the high resistivity electrode; a first photonic temperature measurand comprising an isothermal region photonic nanoresonator or a first primary photonic quantum temperature standard and that is disposed on the isothermal region from which a temperature of the isothermal region is determinable; and a second photonic temperature measurand comprising a chip photonic nanoresonator or a second primary photonic quantum temperature standard and that is disposed on the photonic chip from which a temperature of the photonic chip is determinable, such that the ac voltage is determined from matching a temperature rise of the isothermal region due to the primary elevated temperature of the isothermal region when the ac voltage is received by the resistive electrode.

Disclosed is a process for performing ac-dc voltage and current equivalence conversion with the photonic ac-dc voltage and current equivalence converter, the process comprising: applying a dc voltage across the resistive electrode; determining the temperature difference between the temperature of isothermal region (resistive electrode) and the temperature of photonic chip; determining the dc Joule heating of the resistive electrode relative to chip temperature by measuring the temperature difference between the temperature of isothermal region (resistive electrode) and the temperature of photonic chip; applying a varied ac voltage across the high resistivity electrode; applying the varied ac voltage across the high resistivity electrode and determining the ac Joule heating from measured temperature difference between the temperature of isothermal region (resistive electrode) and the temperature of photonic chip; and matching the ac Joule heating to the dc Joule heating to perform ac-dc voltage equivalence conversion.

Disclosed is a process for determining the temperature difference between the temperature of an isothermal region and temperature of a photonic chip of a photonic ac-dc voltage and current equivalence converter, the process comprising: measuring, with the isothermal region photonic nanoresonator, the temperature of the resistive electrode; measuring, with the chip photonic nanoresonator, the temperature of the photonic chip; and taking a difference between measured isothermal region temperature and photonic chip temperature.

Disclosed is a process for determining the temperature difference between the temperature of an isothermal region and temperature of a photonic chip of a photonic ac-dc voltage and current equivalence converter, the process comprising measuring the frequency beating of the isothermal region temperature probe light from the isothermal region photonic nanoresonator and the chip temperature probe light from the chip photonic nanoresonator.

Disclosed is a method of determining the temperature difference between the temperature of isothermal region and the temperature of photonic chip, the process comprising: splitting the isothermal light source into isothermal region temperature probe light and chip temperature probe light; measuring the temperature of photonic chip using the chip probe light; using the frequency synthesizer and frequency modulator shift the frequency of the isothermal region temperature probe light to be equal to the first photonic resonance frequency; using the frequency counter measure RF drive signal applied from frequency synthesizer to the frequency modulator; and deriving temperature difference from measured RF drive signal.

Disclosed is a method of determining the temperature difference between the temperature of isothermal region and the temperature of photonic chip, the process comprising: applying isothermal region temperature probe light from isothermal region light source to isothermal region photonic nanoresonator and photonic chip nanoresonator connected in series or parallel and coupling the output light to the photodetector; sweeping isothermal region probe light through a range of frequencies encompassing both the first and the second resonance frequencies; applying photodetector output signal to signal analyzer and measure the time delay between the time that the frequency of isothermal region light source matches first photonic resonance frequency and the time that the frequency of isothermal region light source matches second photonic resonance frequency; and converting the measured time delay to the difference between the first and the second resonance frequencies.

BRIEF DESCRIPTION OF THE DRAWINGS

The following description cannot be considered limiting in any way. With reference to the accompanying drawings, like elements are numbered alike.

DETAILED DESCRIPTION

Figure 1A:
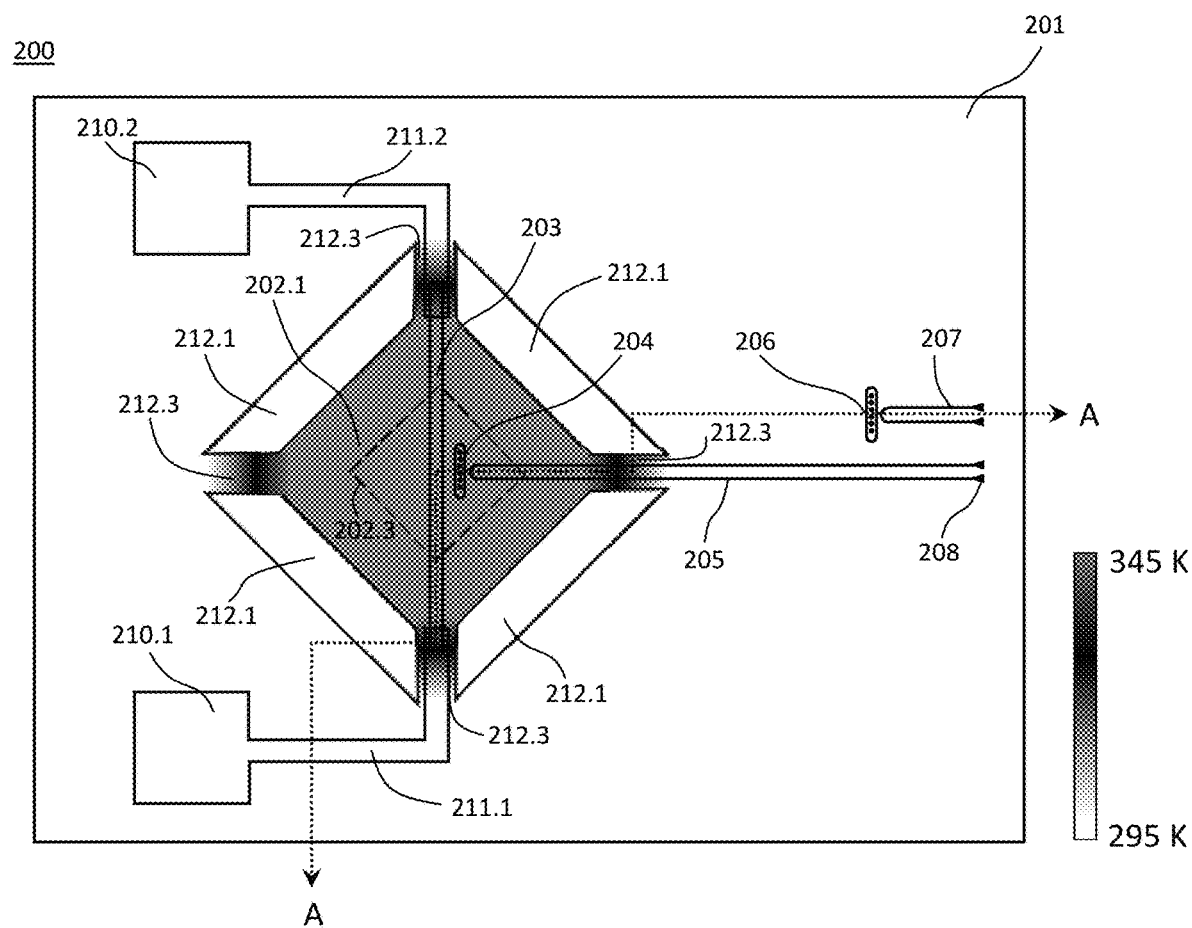
FIG. 1A shows a configuration for a photonic ac-dc voltage and current equivalence converter, according to some embodiments.

A detailed description of one or more embodiments is presented herein by way of exemplification and not limitation.

Calibration of electronic instruments ensures accuracy and consistency of measurements made by the instrument. Such calibration may rely upon converting ac and dc voltages or currents that involve knowledge of a dc voltage or dc current level to elucidate the ac voltage or ac current level. Because characteristics such as impedance values and amplifier gain in electric measuring instruments change with time, temperature, and other factors, the components of the instruments require periodic calibration to assure measurement accuracy. Prior to the advent of microprocessors, calibrators, i.e., standard sources used to calibrate electric measuring instruments, were generally from time-to-time calibrated by physically adjusting components in the calibrator so outputs of the calibrator comply with external standards. In complex calibrators, many internal physical adjustments, involving time-consuming calibration routines often taking many hours, must be made.

With the advent of microprocessors and associated devices, such as random access memories and read-only memories, the calibration process and the apparatus required to achieve calibration have been greatly simplified. Random access memories store calibration correction factors and use software to compensate for gain and zero errors on multiple ranges of different measurements. Modern devices have used microprocessors and electronic memories to store constants based on comparisons to external standards for instrument calibration. The microprocessors and electronic computer memories store internal software and correction factors, almost to eliminate the need to remove covers of the devices. Hence, the need to physically adjust components within the devices has been virtually eliminated.

However, removing the need to make physical adjustments to components within a device such as a measuring instrument is only a small step to reducing the calibration procedure cost. For example, calibration of a multimeter having multiple functions and ranges or a precision source having multiple ranges still requires many different external stimuli to be applied to the instrument or source. The time required to apply these stimuli and the cost involved in supporting the extensive external standards which must be used in the calibration process are contrary to the modern trend of reduced instrument ownership costs. Need persists for calibrating sources used to supply parameters, i.e., voltage, current and impedance, to electric measuring instruments. Further, need exists for calibrating electric measuring instruments having multiple functions and ranges or sources having multiple ranges. Additionally, it would be advantageous to calibrate electric measuring instruments or sources without making physical adjustments to components within a calibration device or requiring external standards.

Problems involved in the use of conventional manual and electronic techniques and apparatuses for calibrating electronic instruments can be understood by considering the example of calibrating an ac voltage source. Calibration of such an instrument, whether it has internally stored software constants or requires manual adjustment, can involve some type of external reference voltage, such as a standard cell, in combination with a null detector to make comparisons, a multi-range ratio divider, or other devices. This array of equipment is connected in various configurations to calibrate ac voltage ranges of the source. The calibration procedure is laborious and repetitive.

One of largest workloads in calibrating modern electric measuring instruments involves calibrating ac electrical instruments including multimeters in laboratories of companies that own such instruments or in laboratories where such instruments should be periodically shipped for calibration purposes. Because these multimeters are becoming more accurate as the workload demand increases, the cost of external calibration has correspondingly increased, or is anticipated to do so. There is a need for relatively inexpensive apparatuses for enabling electronic multimeters to be calibrated occasionally with a calibrating device, which can minimize the cost of ownership by minimizing calibration time.

Moreover, one technology for converting ac and dc voltage relies upon cryogenic instrumentation and costly waveform generators that, too, are subject to calibration and statistical analysis to quantify jitter and other operating parameters. In one method for calibrating ac measurement standards, a pulse-driven Josephson voltage standard and an inductive voltage divider can be used. Here, a quantum ac voltage source based on a pulse-driven ac Josephson voltage standard is used for low-voltage ac-dc transfer calibrations, wherein the ac Josephson voltage standard uses an array of Josephson junctions, driven by delta-sigma modulated radio frequency pulses to create precisely known voltages with a defined harmonic content. Since the maximum voltage achievable by the ac Josephson voltage standard is several volts, its main application for metrological purposes has been calibration of thermal transfer standards (TTS) on their millivolt ranges. However, there is a need to increase calibration capabilities by multiple orders of magnitude in voltage, e.g., for calibration of ac voltage measurement standards such as ac voltmeters in an absence of complicated, expensive equipment.

It has been discovered that the photonic ac-dc voltage and current equivalence converter described here overcomes technical problems with conventional ac-dc converters and derives from measurements of local temperature rise induced by Joule heating from ac or dc electrical current. The photonic ac-dc voltage and current equivalence converter provides a photonics-based temperature measurement with higher fidelity than thermocouples in both temperature resolution and reproducibility.

Some conventional ac-dc equivalence thermal converters use metallic thermocouple arrays to measure Joule heating in a resistive electrode, but these devices can have limitations in measuring ac-dc equivalence at high ac frequencies. In particular, in the radio frequency (rf) regime, the signal through the resistive electrode capacitively couples to the metal thermocouple array, resulting in a frequency-dependent heater impedance that affects the Joule heating of the thermal element and the electrical readout from the thermocouple array. The result of this frequency-dependent effect is an increase in the measurement uncertainty at high frequencies. The photonic ac-dc voltage and current equivalence converter described here, unlike a metal thermocouple array, can include a waveguide-integrated photonic thermometer that does not capacitively couple to the resistive heater element to reduce frequency dependence on Joule heating and to reduce the difference in the measured rise in temperature between a dc signal and an ac signal. Beneficially, in addition to precision electrical measurements, the photonic ac-dc voltage and current equivalence converter can be used as a flow sensor or used in harsh environments such as chemical plants and engines.

Photonic ac-dc voltage and current equivalence converter 200 performs ac-dc voltage and current equivalence conversion. In an embodiment, with reference to FIG. 1, FIG. 2, FIG. 3, FIG. 4, FIG. 5, FIG. 6, and FIG. 7 photonic ac-dc voltage and current equivalence converter 200 includes: photonic chip 201; weak thermal link 212 disposed on and in mechanical communication with photonic chip 201; isothermal region 202 disposed on weak thermal link 212 an in mechanical communication with weak thermal link 212; an isothermal region 202 can be comprises of the combination of the following elements: an isothermal membrane 202.1, an isothermal substrate 202.2, an isothermal obelisk 202.3 disposed on either isothermal membrane 202.1, or the isothermal substrate 202.2; a weak thermal link 212 disposed on the photonic chip 201 and connecting the isothermal region 202 to the photonic chip 201; the weak thermal link 212 thermally isolates the isothermal region 202 form the photonic chip 201; when isothermal region 202 comprised of isothermal membrane 202.1, the weak thermal link 212 mechanically suspends the isothermal region 202 from the photonic chip 201; the weak thermal link 212 can be comprised of the following elements interposed between the isothermal region 202 and the photonic chip 201: isolation trenches 212.1, an isolation membrane 212.2, isolation tethers 212.3; the weak isolation tether 212.3 is bridge-type-structure, one end of which is disposed on chip 201 and the opposite end is disposed on isothermal region 202, tether 212.3 allows weak thermal link between isothermal region 202 and chip 201, as well a mechanical suspension of isothermal region 202 from photonic chip 201; isolation membrane 212.2 disposed on isothermal region 202 and chip 201 and provide weak thermal link between isothermal region 202 and chip 201; resistive electrode 203 disposed on isothermal region 202 and in thermal communication with isothermal region 202 and that receives dc voltage 217, resistively heats to a primary elevated temperature in response to dc voltage 217, receives ac voltage 218 non-contemporaneously with dc voltage 217, resistively heats to a test elevated temperature in response to ac voltage 218, and heats isothermal region 202 via heat transfer from resistive electrode 203 to isothermal region 202 based on primary elevated temperature and test elevated temperature of resistive electrode 203; isothermal region photonic nanoresonator 204 disposed on isothermal region 202 and including a first photonic resonance from which a temperature of isothermal region 202 is determinable and that varies with temperature of isothermal region 202 and that receives isothermal region temperature probe light 219 from isothermal region waveguide 205; isothermal region waveguide 205 disposed on me isothermal region 202 in optical communication with isothermal region photonic nanoresonator 204 and that communicates isothermal region temperature probe light 219 to membrane photonic nanoresonator 204 and that monitors transmission and storage of isothermal region temperature probe light 219 by isothermal region photonic nanoresonator 204 to determine the temperature of isothermal region 202; chip photonic nanoresonator 206 disposed on photonic chip 201 and in thermal communication with photonic chip 201 and including a second photonic resonance from which a temperature of photonic chip 201 is determinable and that varies with temperature of photonic chip 201 and that receives chip temperature probe light 220 from chip waveguide 207; and chip waveguide 207 disposed on photonic chip 201 in optical communication with chip photonic nanoresonator 206 and that communicates chip temperature probe light 220 to chip photonic nanoresonator 206 and that monitors transmission and storage of chip temperature probe light 220 by chip photonic nanoresonator 206 to determine the temperature of isothermal region 202, such that ac voltage 218 is determined from matching a temperature rise of isothermal region 202 due to primary elevated temperature of isothermal region 202 when ac voltage 218 is received by resistive electrode 203.

According to an embodiment, with reference to FIG. 3, and FIG. 4 photonic ac-dc voltage and current equivalence converter 200 includes: photonic chip 201; weak thermal link 212 disposed on and in mechanical communication with photonic chip 201; isothermal region 202 disposed on weak thermal link 212 and in mechanical communication with weak thermal link 212; an isothermal region 202 can be comprises of the combination of the following elements: an isothermal membrane, 202.1, an isothermal substrate 202.2, an isothermal obelisk 202.3 disposed on either isothermal membrane 202.1, or the isothermal substrate 202.3; the weak thermal link 212 thermally isolates the isothermal region 202 form the photonic chip 201; when isothermal region 202 comprised of isothermal membrane 202.1, the weak thermal link 212 mechanically suspends the isothermal region 202 from the photonic chip 201; the weak thermal link 212 can be comprised of the following elements interposed between the isothermal region 202 and the photonic chip 201: isolation trenches 212.1, an isolation membrane 212.2, tethers 212.3; tether 212.3 is bridge-type-structure, one end of which is disposed on chip 201 and the opposite end is disposed on isothermal region 202, tether 212.3 allows weak thermal link between isothermal region 202 and chip 201, as well a mechanical suspension of isothermal region 202 from photonic chip 201; isolation membrane 212.2 disposed on isothermal region 202 and chip 201 and provides weak thermal link between isothermal region 202 and chip 201; resistive electrode 203 disposed on isothermal region 202 and in thermal communication with isothermal region 202 and that receives dc voltage 217, resistively heats to a primary elevated temperature in response to dc voltage 217, receives ac voltage 218 non-contemporaneously with dc voltage 217, resistively heats to a test elevated temperature in response to ac voltage 218, and heats isothermal region 202 via heat transfer from resistive electrode 203 to isothermal region 202 based on the primary elevated temperature and the test elevated temperature of resistive electrode 203; first primary photonic quantum temperature standard 226.1 disposed on isothermal region 202 and in mechanical communication with isothermal region 202 such that averaged mean square amplitude of the thermally driven mechanical oscillations of the first primary photonic quantum temperature standard 226.1 is directly related to the temperature of isothermal region 202 and from which the temperature of isothermal region 202 is determinable, wherein the averaged mean square amplitude varies with temperature of isothermal region 202 and is measured with isothermal region temperature probe light 219 from the first primary photonic quantum temperature standard 226.1 with isothermal region temperature probe light 219 to determine the temperature of isothermal region 202; second primary photonic quantum temperature standard 226.2 disposed on photonic chip 201 and in thermal communication with photonic chip 201 such that averaged mean square amplitude of the thermally driven mechanical oscillations of second primary photonic quantum temperature standard 226.2 is directly related to the temperature of photonic chip 201 and from which the temperature of photonic chip 201 is determinable, wherein the amplitude varies with temperature of photonic chip 201 and is measured from the second primary photonic quantum temperature standard 226.2 and that communicates chip temperature probe light 220 with second primary photonic quantum temperature standard 226.2 and monitors the averaged mean square amplitude of the mechanical oscillations of second primary photonic quantum temperature standard 226.2 with chip temperature probe light 220 to determine the temperature of photonic chip 201, such that ac voltage 218 is determined from matching a temperature rise of isothermal region 202 due to primary elevated temperature of isothermal region 202 when ac voltage 218 is received by resistive electrode 203. Photonic ac-dc voltage equivalence converter 200 can include isothermal region photonic nanoresonator 204 and isothermal region waveguide 205 disposed on isothermal region 202 to measure the temperature of isothermal region 202. Photonic ac-dc voltage and current equivalence converter 200 can include chip photonic nanoresonator 206 and chip waveguide 207 disposed on photonic chip 201 to measure the temperature of photonic chip 201.

Photonic ac-dc voltage and current equivalence converter 200 can include a combination of isothermal region photonic nanoresonator 204, chip photonic nanoresonator 206, or primary photonic quantum temperature standard 226. In an embodiment, with reference to FIG. 5, FIG. 6, and FIG. 7 photonic ac-dc voltage and current equivalence converter 200 includes isothermal region photonic nanoresonator 204 disposed on isothermal region 202 and primary photonic quantum temperature standard 226 disposed on photonic chip 201. In an embodiment, photonic ac-dc voltage and current equivalence converter 200 includes: photonic chip 201; weak thermal link 212 disposed on and in mechanical communication with photonic chip 201; isothermal region 202 disposed on weak thermal link 212 and in mechanical communication with weak thermal link 212; an isothermal region 202 can be comprises of the combination of the following elements: an isothermal membrane, 202.1, an isothermal substrate 202.2, an isothermal obelisk 202.3 disposed on either isothermal membrane 202.1, or the isothermal substrate 202.3; the weak thermal link 212 thermally isolates the isothermal region 202 form the photonic chip 201 and mechanically suspend the isothermal region 202 from the photonic chip 201; the weak thermal link 212 can be comprised of the following elements interposed between the isothermal region 202 and the photonic chip 201: isolation trenches 212.1, an isolation membrane 212.2, isolation tethers 212.3; isolation tether 212.3 is bridge-type-structure, one end of which is disposed on chip 201 and the opposite end is disposed on isothermal region 202, tether 212.3 allows weak thermal link between isothermal region 202 and chip 201, as well a mechanical suspension of isothermal region 202 from photonic chip 201; isolation membrane 212.2 disposed on isothermal region 202 and chip 201 and provides weak thermal link between isothermal region 202 and chip 201; resistive electrode 203 disposed on isothermal region 202 and in thermal communication with isothermal region 202 and that receives dc voltage 217, resistively heats to a primary elevated temperature in response to dc voltage 217, receives ac voltage 218 non-contemporaneously with dc voltage 217, resistively heats to a test elevated temperature in response to ac voltage 218, and heats isothermal region 202 via heat transfer from resistive electrode 203 to isothermal region 202 based on primary elevated temperature and test elevated temperature of resistive electrode 203; a first photonic temperature measurand including isothermal region photonic nanoresonator 204 or first primary photonic quantum temperature standard 226.1 and that is disposed on isothermal region 202 from which a temperature of isothermal region 202 is determinable; and a second photonic temperature measurand including chip photonic nanoresonator 206 or second primary photonic quantum temperature standard 226.2 and that is disposed on photonic chip 201 from which a temperature of photonic chip 201 is determinable, such that ac voltage 218 is determined from matching a temperature rise of isothermal region 202 due to primary elevated temperature of isothermal region 202 when the ac voltage 218 is received by resistive electrode 203.

Encapsulation medium 225 can be disposed on various components to shield the components against environmental effects. In an embodiment, with reference to FIG. 2, and FIG. 4, photonic ac-dc voltage and current equivalence converter 200 includes encapsulation medium 225 disposed on isothermal region 202, isothermal region photonic nanoresonator 204, and chip photonic nanoresonator 206 to shield isothermal region photonic nanoresonator 204 and chip photonic nanoresonator 206 from perturbation by an environmental effect comprising humidity or moisture. Encapsulation medium 225 can be any material that is compatible with the device and that does not interfere or perturb the optical or mechanical properties of the components of photonic ac-dc voltage and current equivalence converter 200. Exemplary materials for encapsulation medium 225 include optical glasses, polymers, electrical insulators, ceramics, and the like.

In photonic ac-dc voltage and current equivalence converter 200, photonic chip 201, isothermal region 202, and weak thermal link 212 independently include a semiconductive material although other materials can be used to make these elements, such as electrically insulating high-dielectric materials, including composites.

Isothermal region photonic nanoresonator 204 and chip photonic nanoresonator 206 independently include a photonic crystal cavity or a whispering gallery mode microresonator although other photonic structures that have a resonance that varies with temperature can be used. Isothermal region photonic nanoresonator 204 and chip photonic nanoresonator 206 independently can include a semiconductive material similar to photonic chip 201 or membrane 202, e.g., silicon.

Primary photonic quantum temperature standard 226 can include any photonic nanoresonator optically coupled to co-located mechanical oscillator, wherein an averaged mean square amplitude of the thermally driven mechanical oscillations of primary photonic quantum temperature standard 226 is directly related to thermodynamic temperature.

Figure 7:
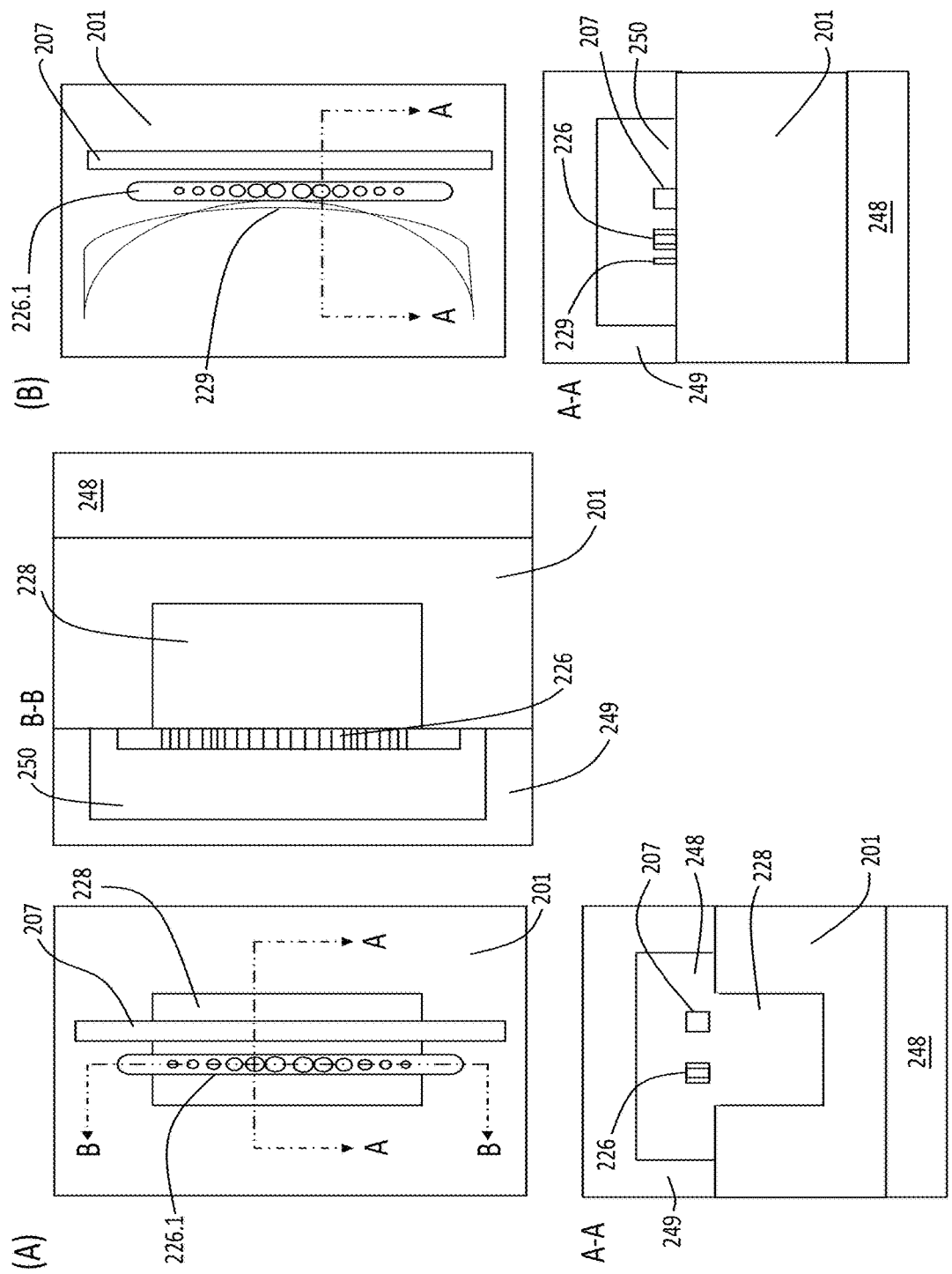
FIG. 7 shows a photonic quantum temperature standard, according to some embodiments.
Figure 8:
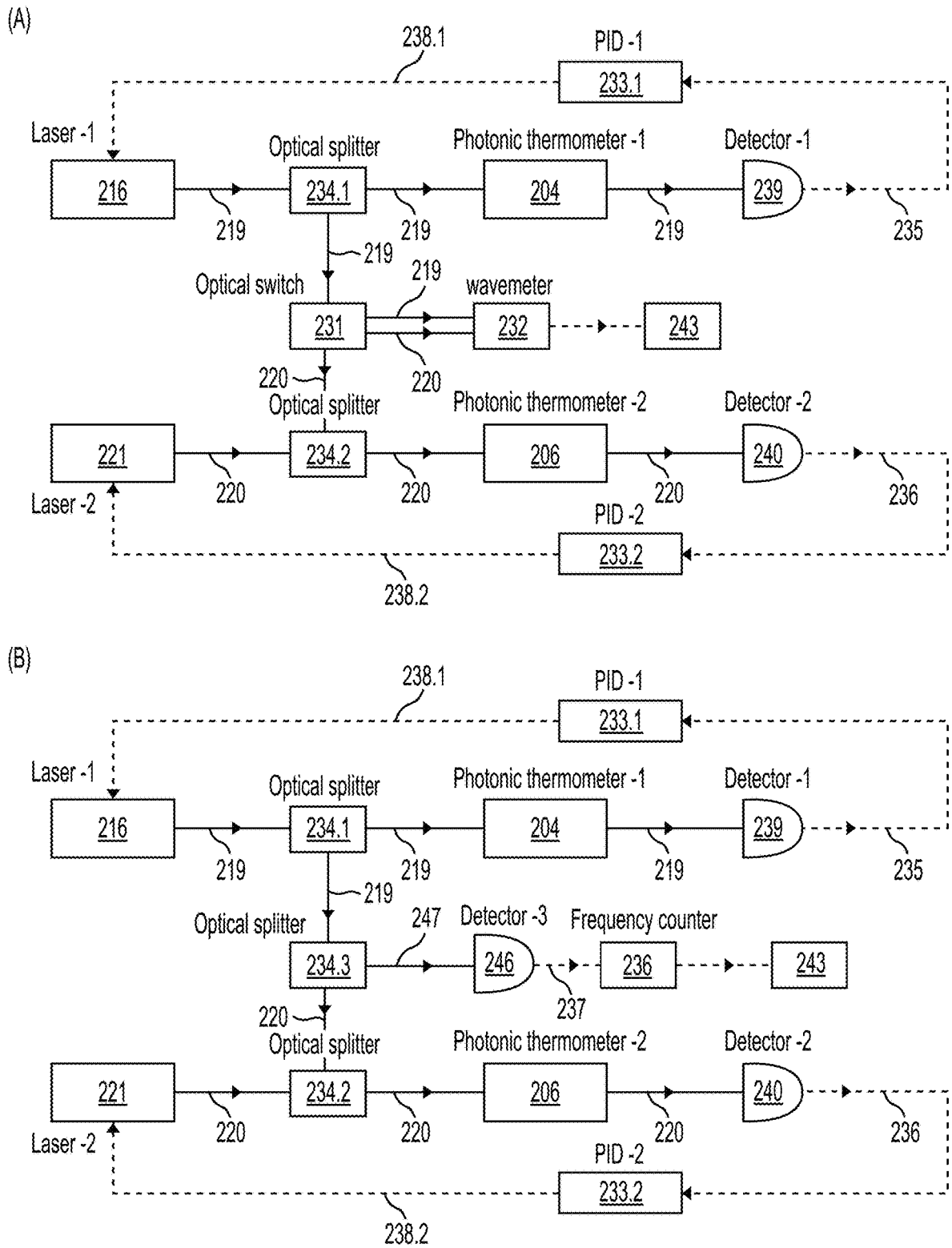
FIG. 8 shows a method of measuring the difference between isothermal region temperature and photonic chip temperature using two separate light sources, according to some embodiments.
Figure 9:
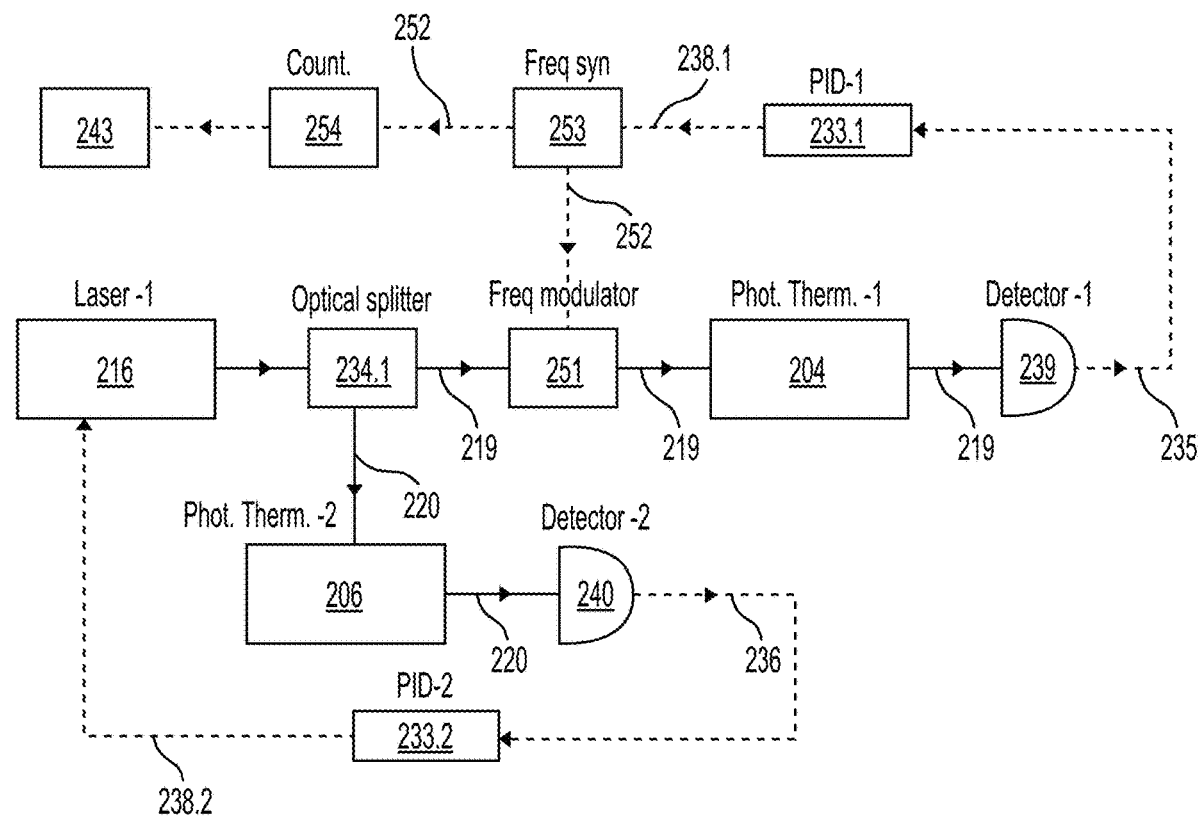
FIG. 9 shows a method of measuring the difference between isothermal region temperature and photonic chip temperature using one common light source, according to some embodiments.
Figure 10A:
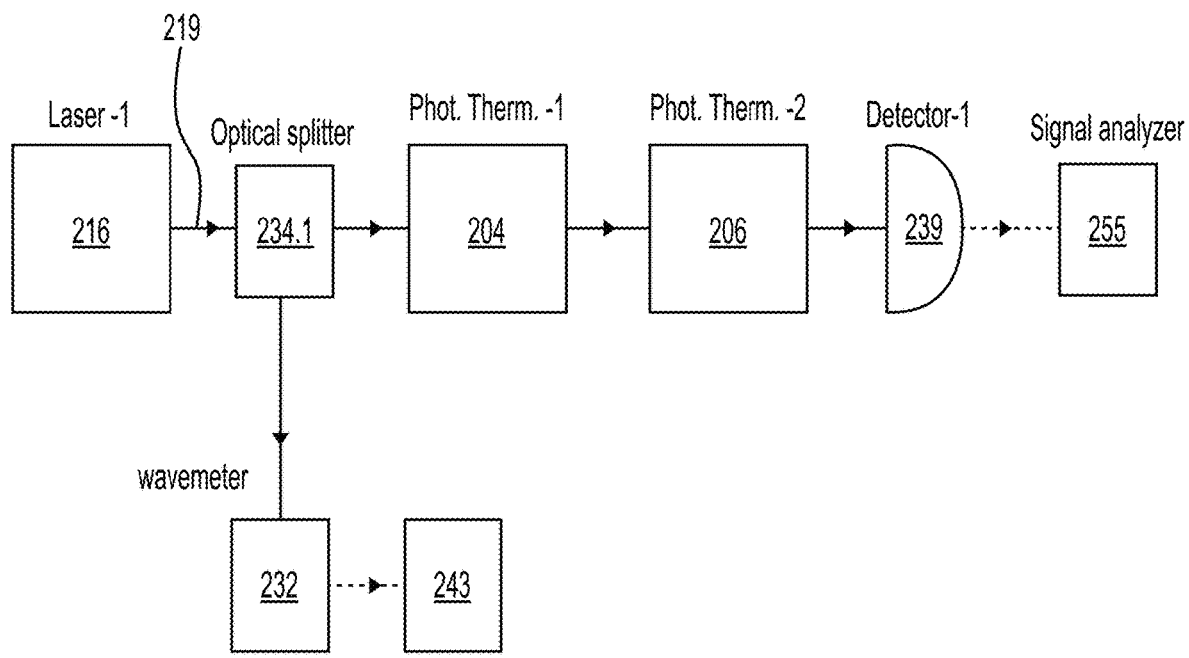
FIG. 10A shows a method of measuring the difference between isothermal region temperature and photonic chip temperature using one common light source, according to some embodiments.
Figure 10B:
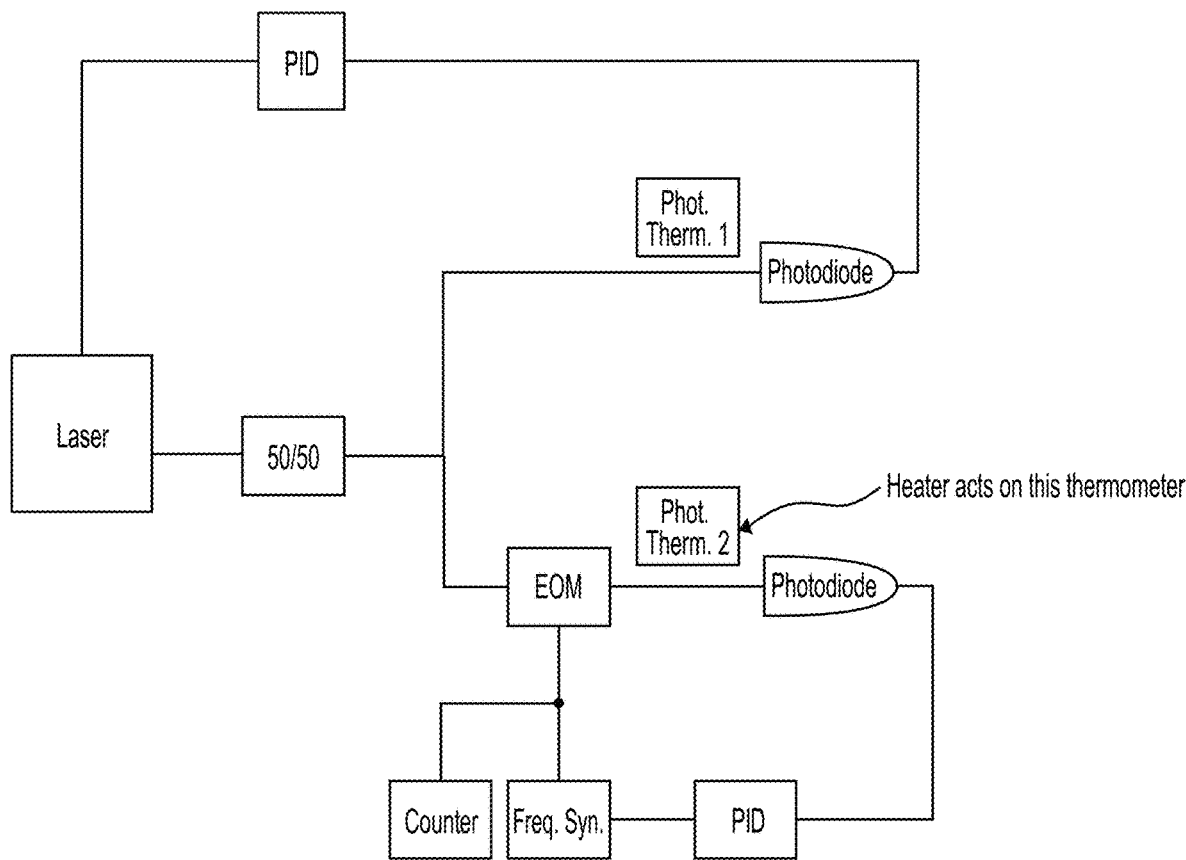
FIG. 10B shows a method of measuring the difference between isothermal region temperature and photonic chip temperature using one common light source, according to some embodiments.
Figure 10C:
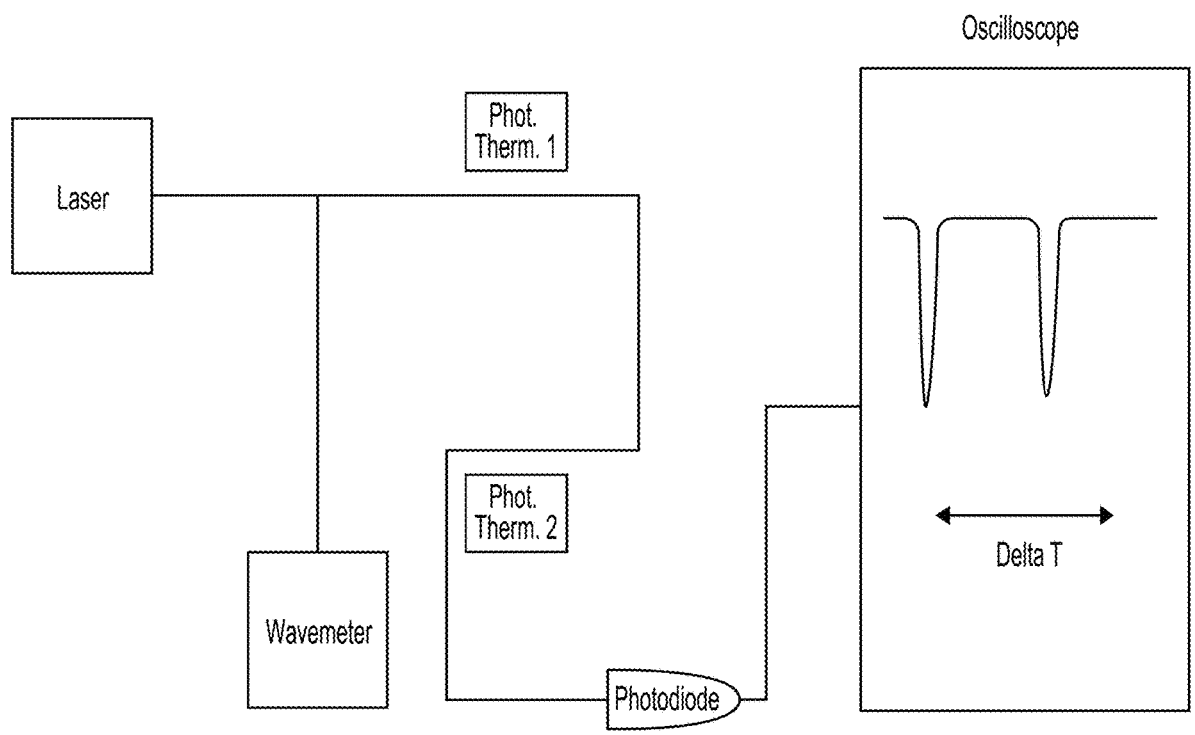
FIG. 10C shows a method of measuring the difference between isothermal region temperature and photonic chip temperature using one common light source, according to some embodiments.
Figure 11:
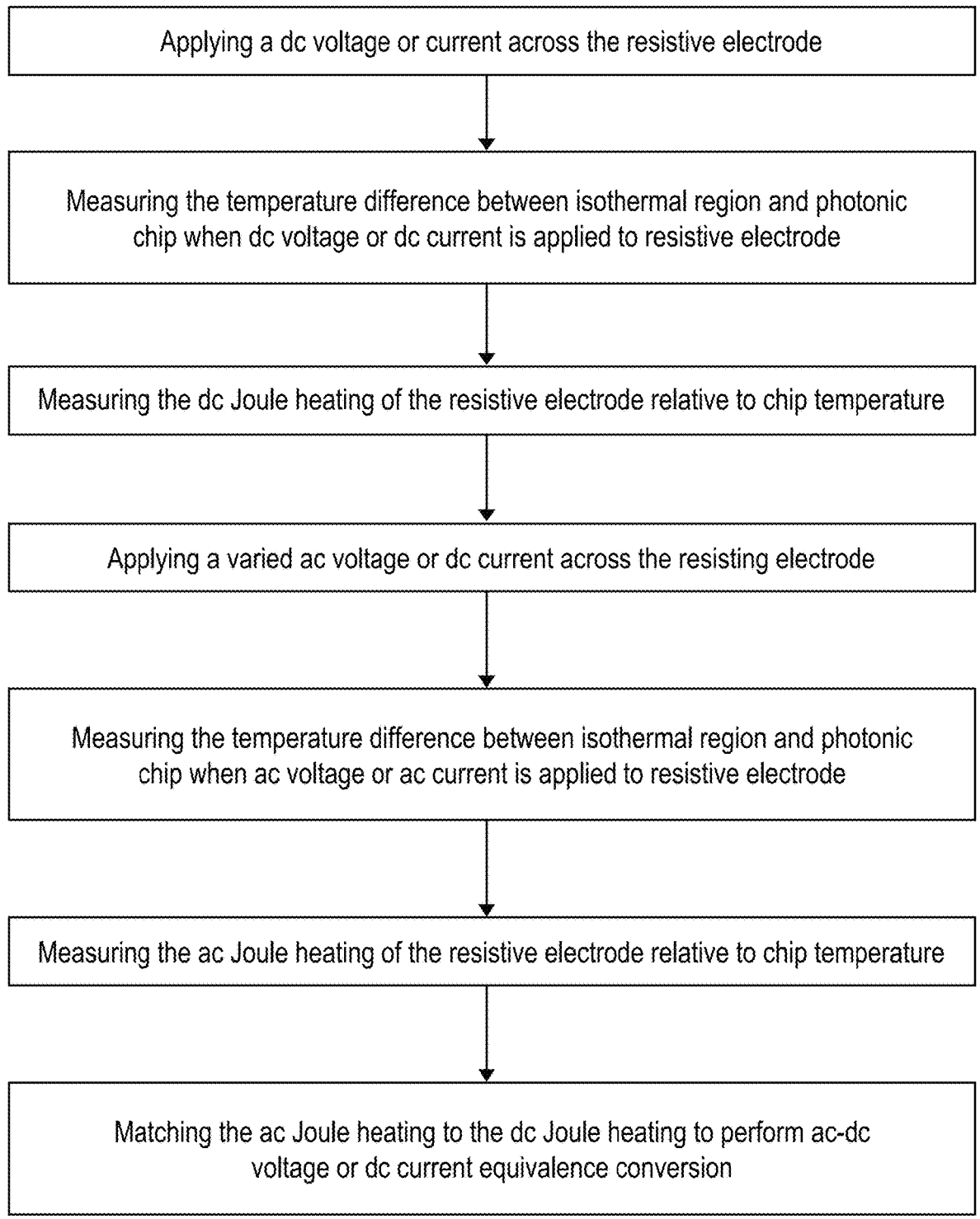
FIG. 11 shows steps in performing ac-dc voltage and current equivalence conversion, according to some embodiments.

In an embodiment, with reference to FIG. 7, primary photonic quantum temperature standard 226 is a suspended nanobeam photonic crystal cavity, and can include nanobeam photonic crystal cavity nanoresonator such described in U.S. Pat. Nos. 8,798,414 and 10,955,617), the disclosure of which is incorporated herein by reference, complemented with undercutting trench 228 that is interposed between the photonic quantum temperature standard 226 and photonic chip 201, In an embodiment, photonic nanoresonator 226.1 is interposed between photonic chip 201 and photonic chip 201, and is suspended over undercutting trench 228.

In another embodiment, with reference to FIG. 7, primary photonic quantum temperature standard 226 is a fin-based optomechanical device, where optomechanical photonic nanoresonator 226.1 is nanobeam photonic crystal cavity nanoresonator, and can include such devices described in U.S. Pat. Nos. 8,798,414 and 10,955,617), the disclosure of which is incorporated herein by reference. In embodiment photonic nanoresonator 226.1 is co-located to chip waveguide 207 and optomechanical fin resonator 229.

The suspended nanobeam photonic crystal cavity or a fin-based optomechanical device can be integrated into photonic ac-dc voltage equivalence converter 200 such that photonic quantum temperature standard 226 is disposed on photonic chip 201, and/or on isothermal region 202, to measure photonic chip temperature and/or isothermal region temperature. It is contemplated that similar to photonic chip 201, primary photonic quantum temperature standard 226 includes a semiconductive material.

In an embodiment, first primary photonic quantum temperature standard 226.1 and second primary photonic quantum temperature standard 226.2 independently include a suspended nanobeam photonic crystal cavity or a fin-based optomechanical device.

Figure 1B:
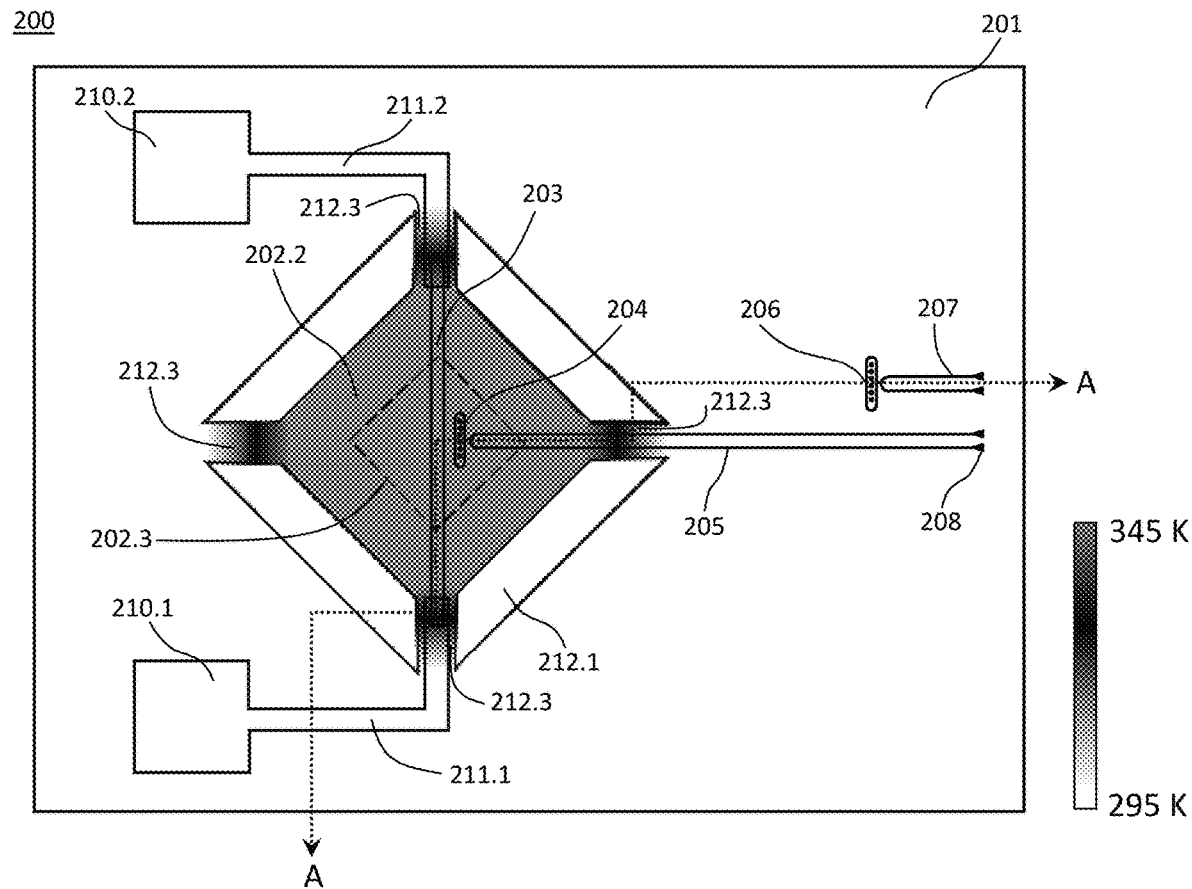
FIG. 1B shows a configuration for a photonic ac-dc voltage and current equivalence converter, according to some embodiments.
Figure 1C:
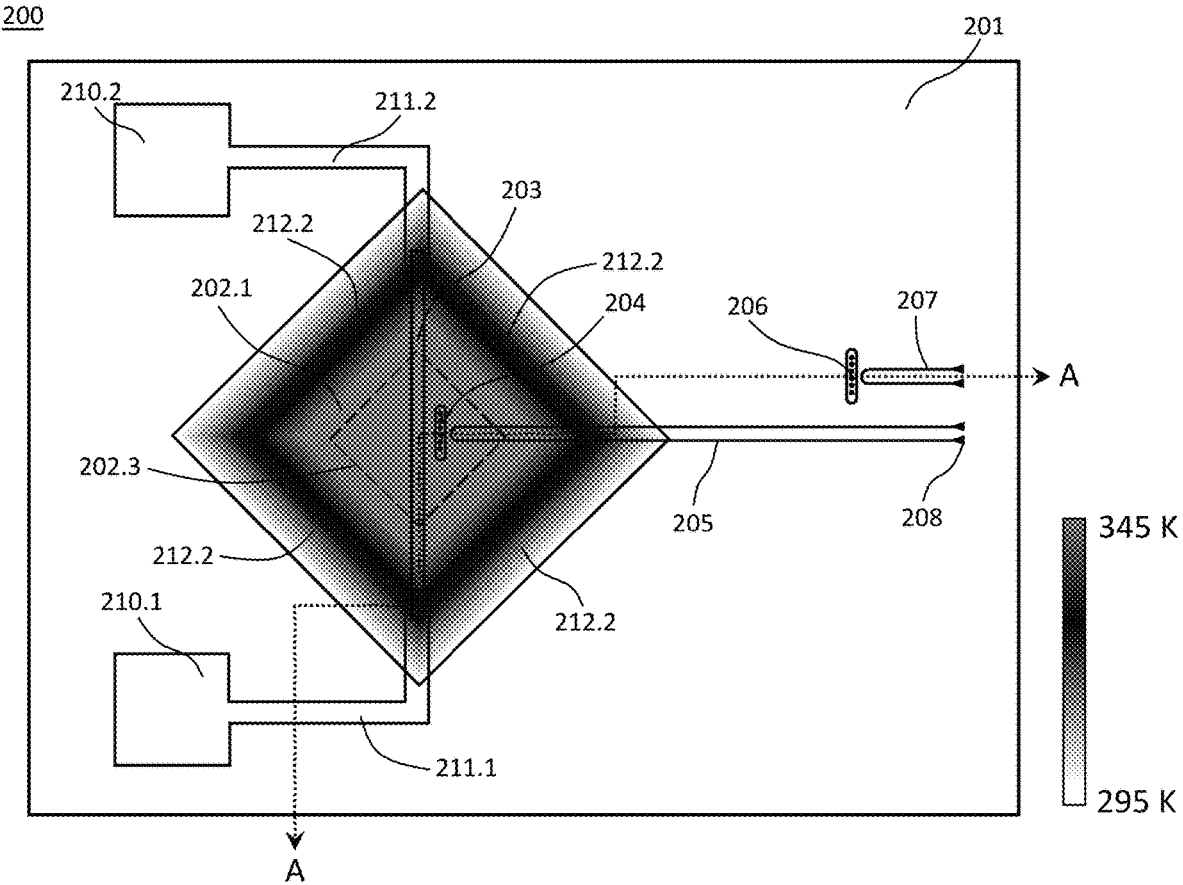
FIG. 1C shows a configuration for a photonic ac-dc voltage and current equivalence converter, according to some embodiments.
Figure 2A:
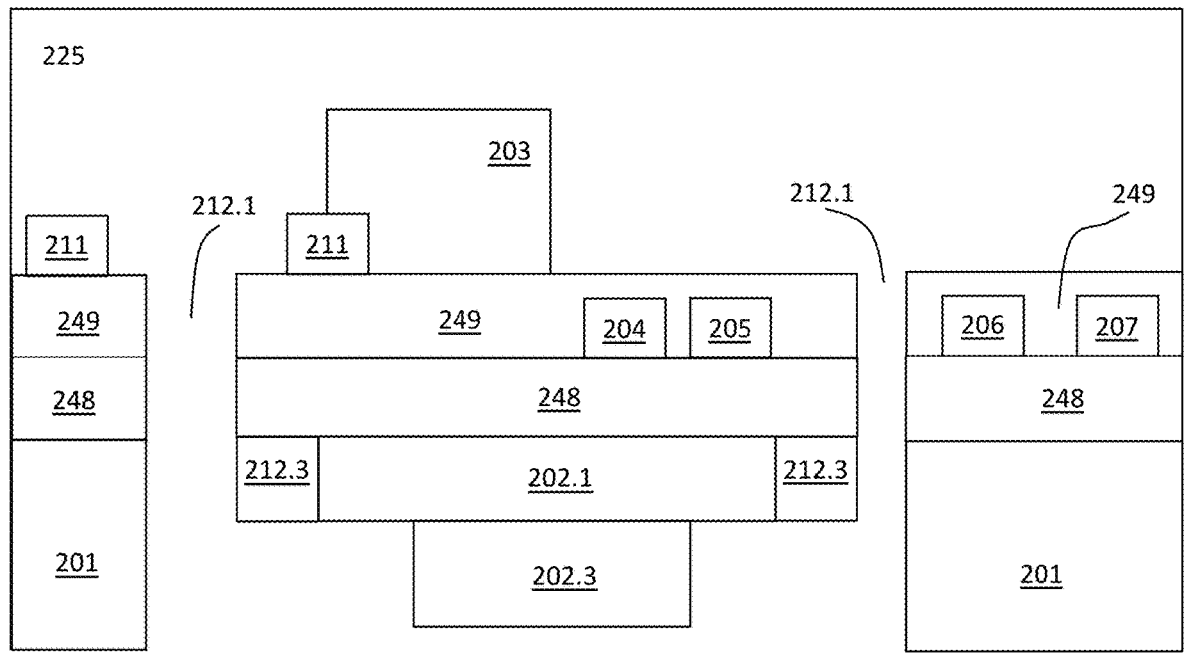
FIG. 2A shows a cross-section along line A-A of the photonic ac-dc voltage and current equivalence converter shown in FIG. 1A, according to some embodiments.
Figure 2B:
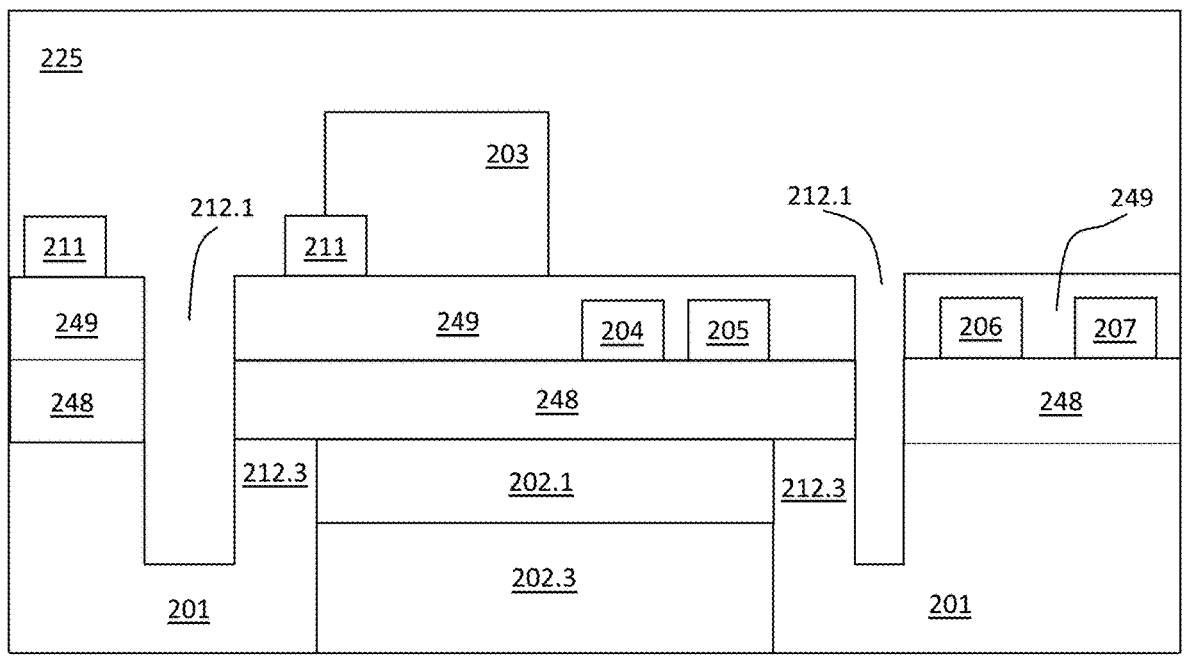
FIG. 2B shows a cross-section along line A-A of the photonic ac-dc voltage and current equivalence converter shown in FIG. 1B, according to some embodiments.
Figure 2C:
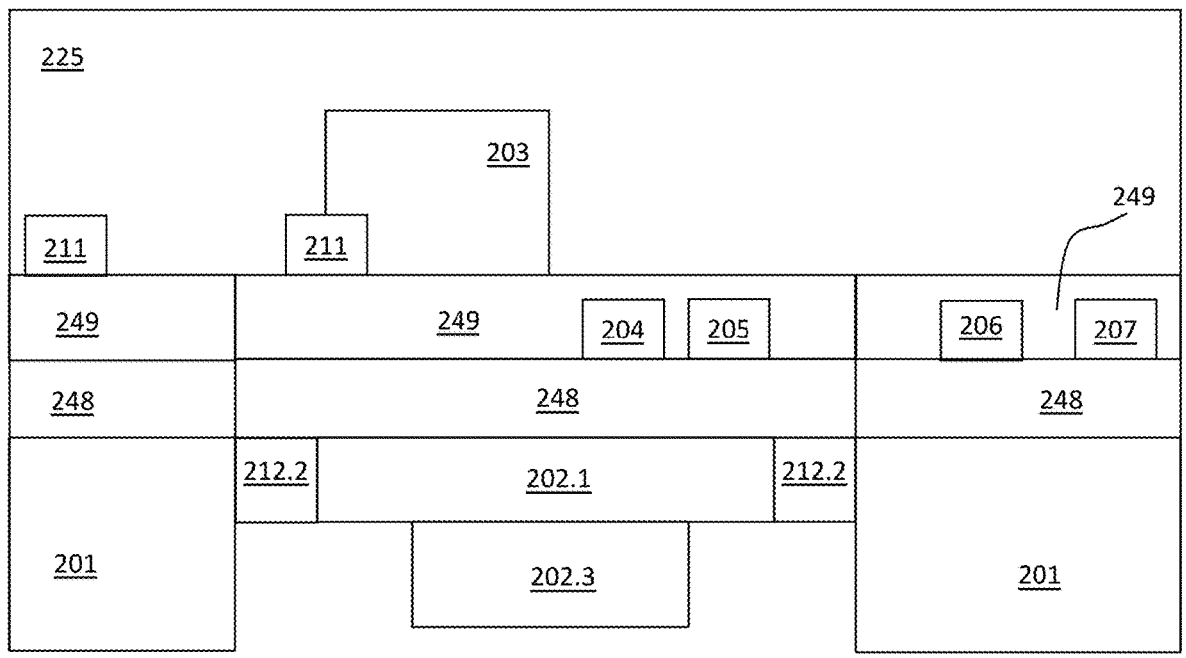
FIG. 2C shows a cross-section along line A-A of the photonic ac-dc voltage and current equivalence converter shown in FIG. 1C, according to some embodiments.
Figure 3A:
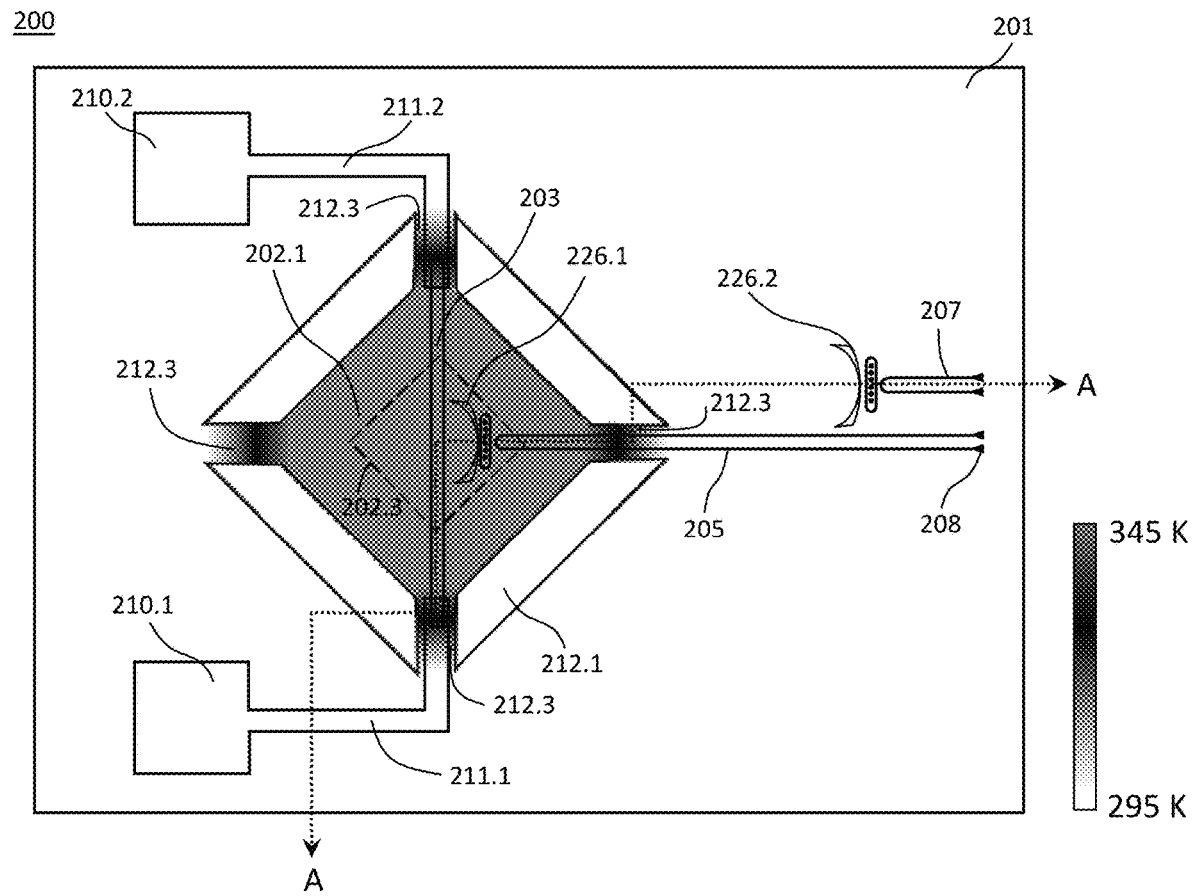
FIG. 3A shows various configurations for a photonic ac-dc voltage and current equivalence converter, according to some embodiments.
Figure 3B:
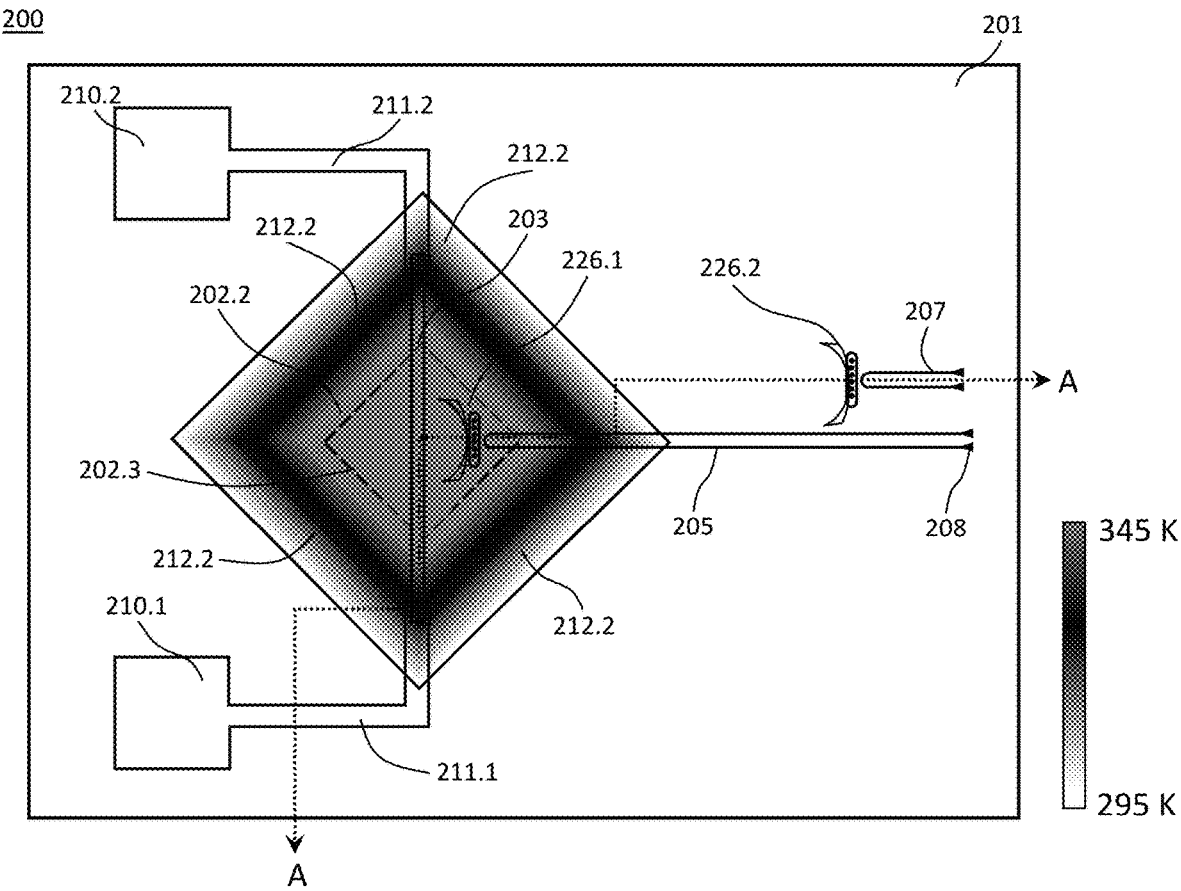
FIG. 3B shows various configurations for a photonic ac-dc voltage and current equivalence converter, according to some embodiments.
Figure 3C:
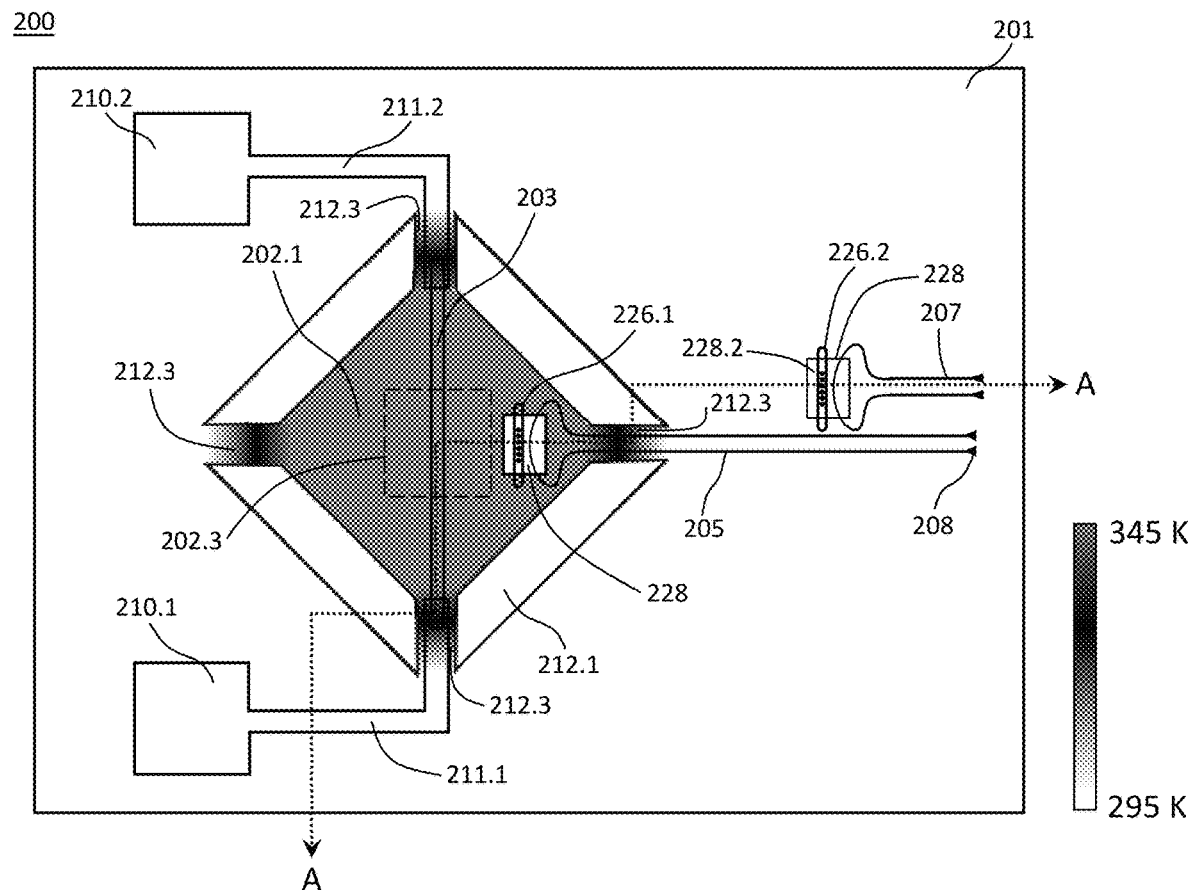
FIG. 3C shows various configurations for a photonic ac-dc voltage and current equivalence converter, according to some embodiments.
Figure 3D:
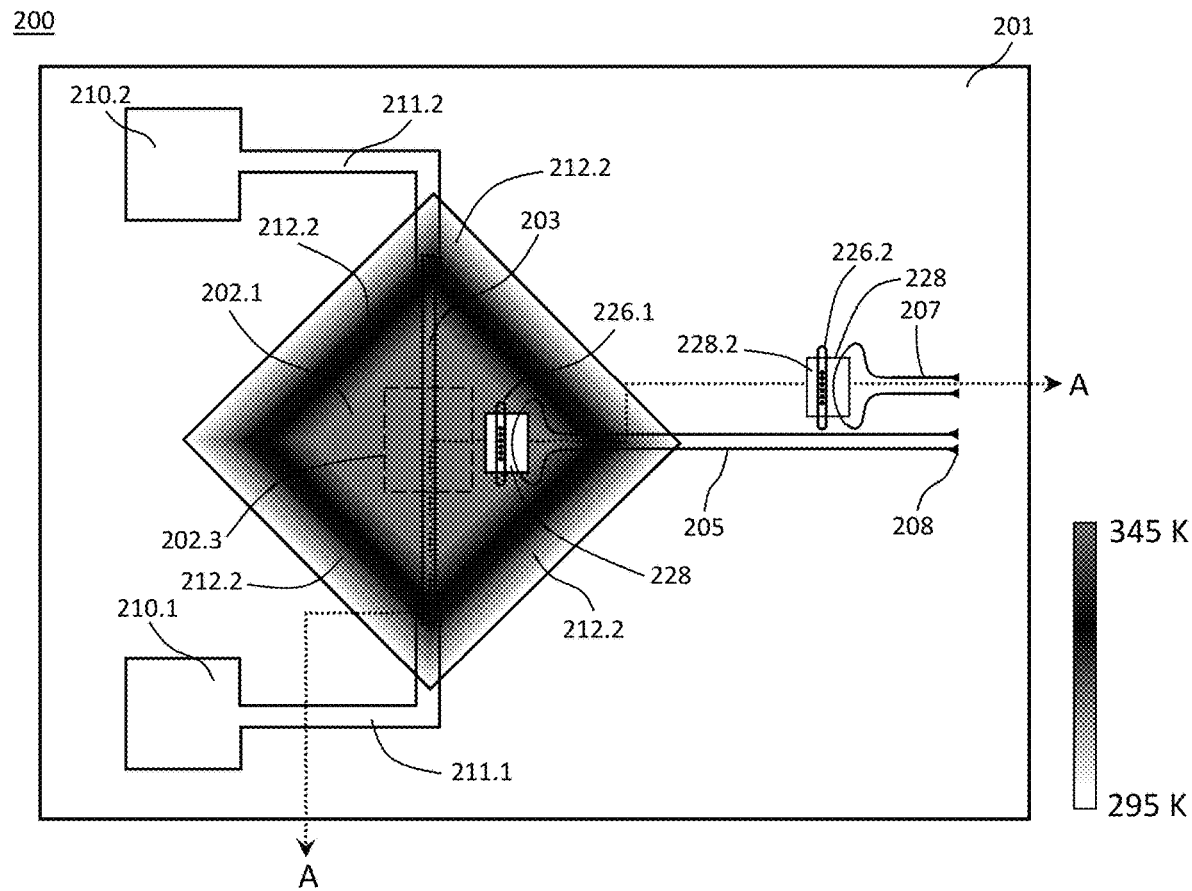
FIG. 3D shows various configurations for a photonic ac-dc voltage and current equivalence converter, according to some embodiments.
Figure 4A:
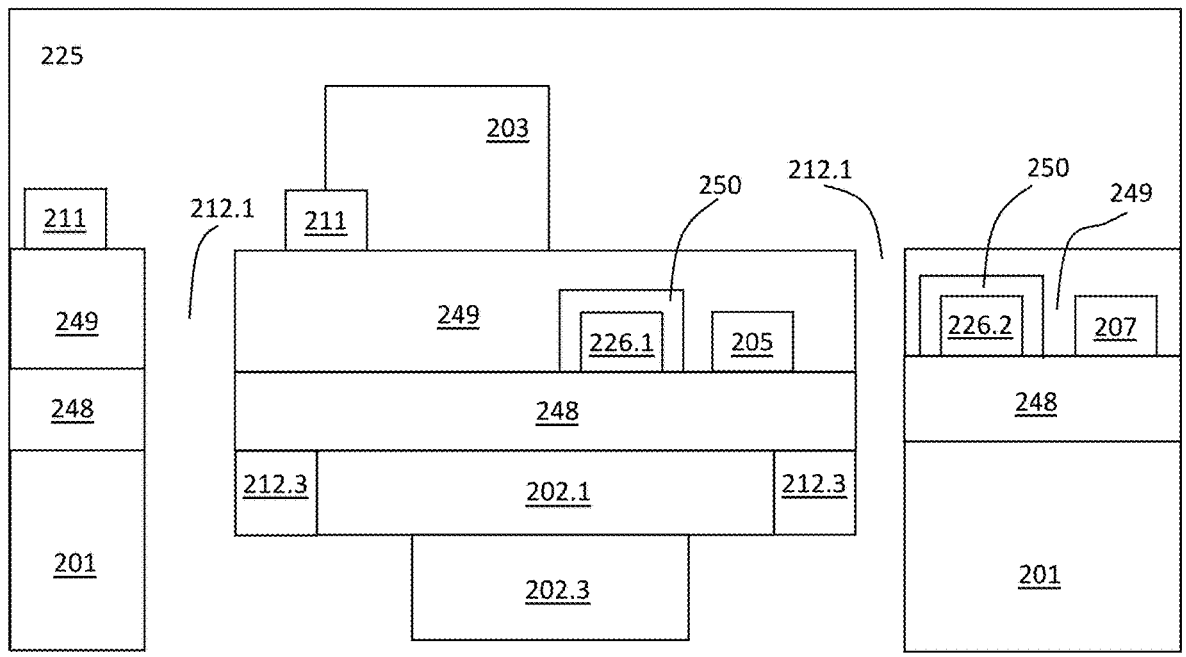
FIG. 4A shows a cross-section along line A-A of the photonic ac-dc voltage and current equivalence converter shown in FIG. 3A, according to some embodiments.
Figure 4B:
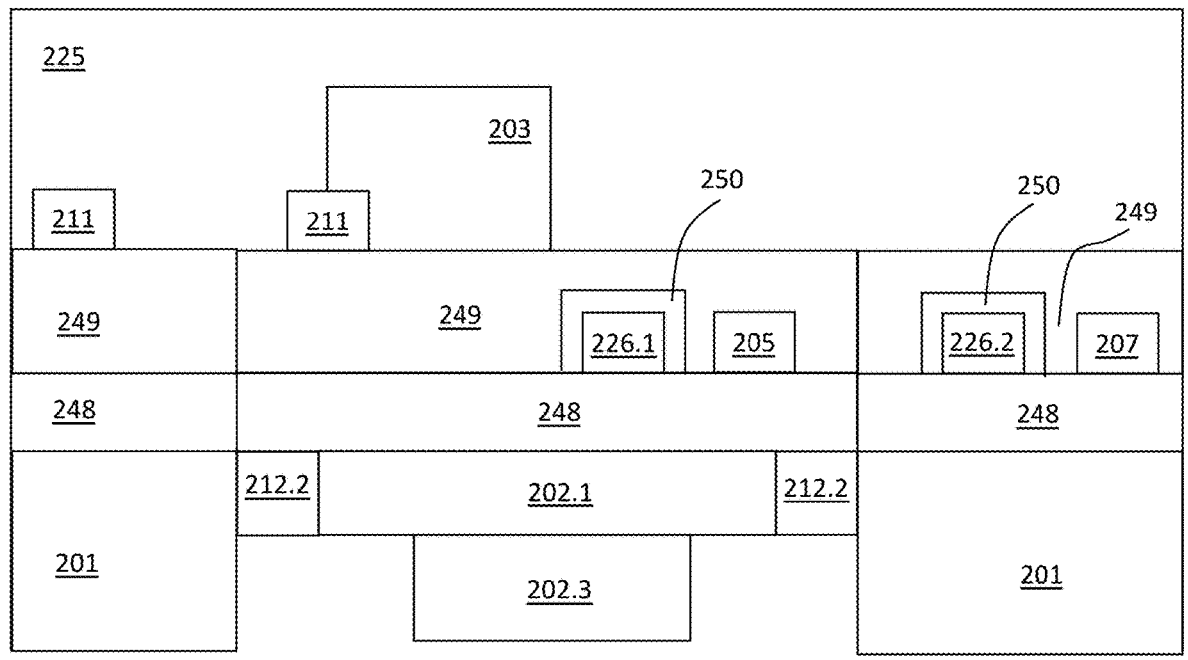
FIG. 4B shows a cross-section along line A-A of the photonic ac-dc voltage and current equivalence converter shown in FIG. 3B, according to some embodiments.
Figure 4C:
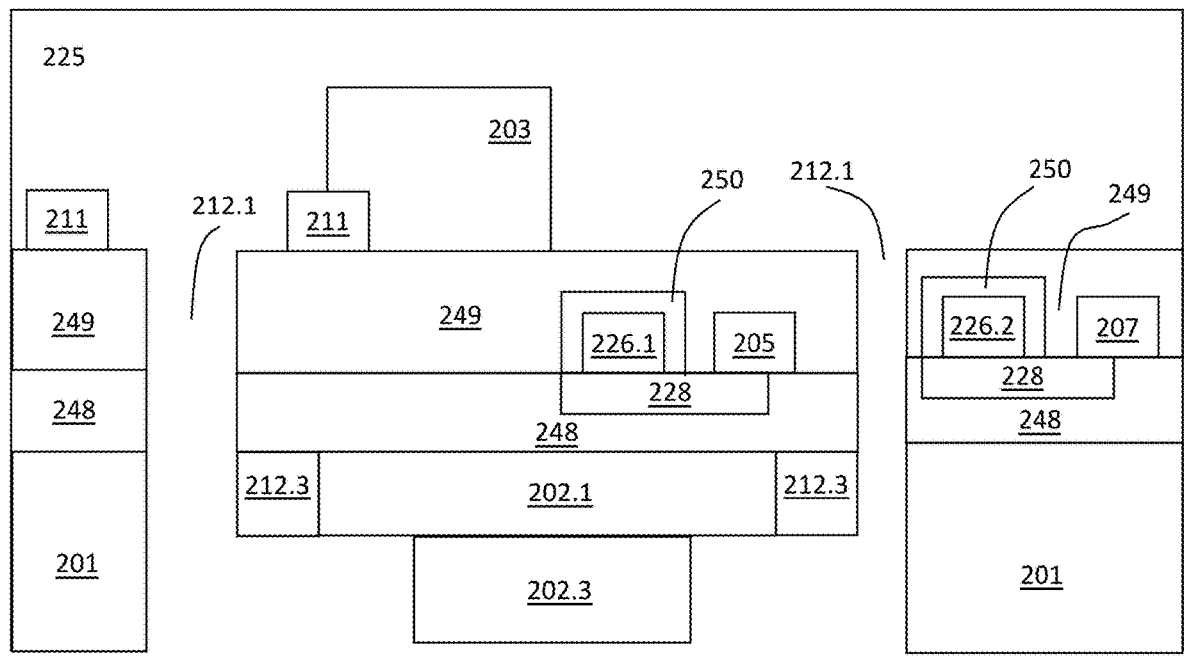
FIG. 4C shows a cross-section along line A-A of the photonic ac-dc voltage and current equivalence converter shown in FIG. 3C, according to some embodiments.
Figure 4D:
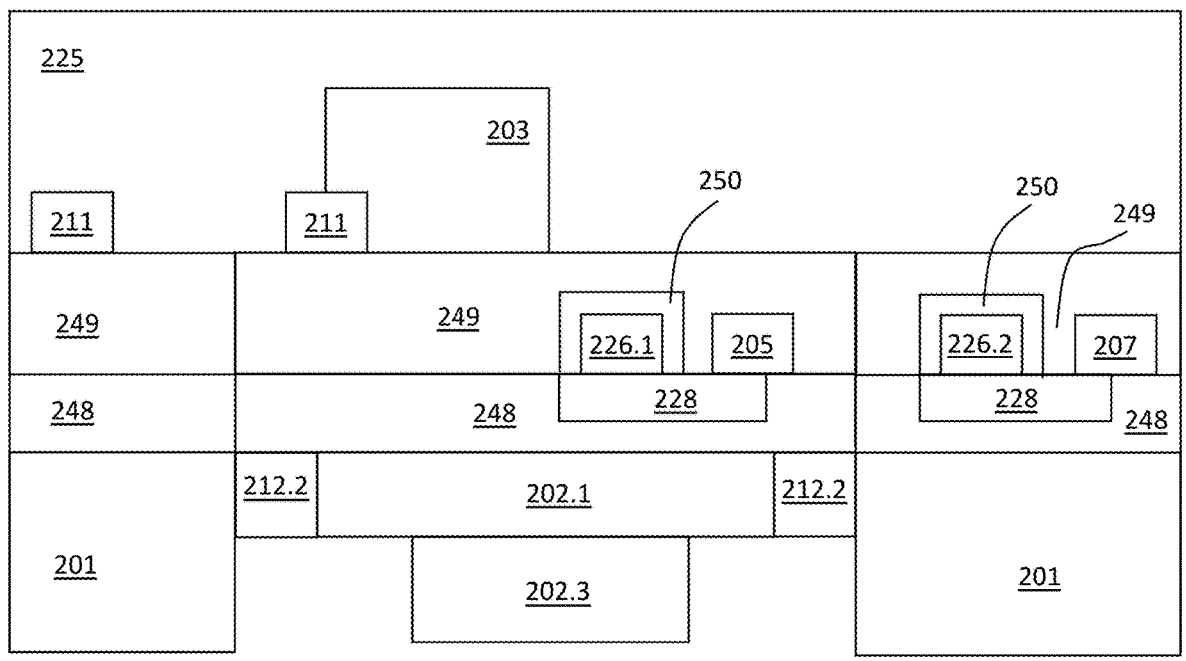
FIG. 4D shows a cross-section along line A-A of the photonic ac-dc voltage and current equivalence converter shown in FIG. 3D, according to some embodiments.
Figure 5A:
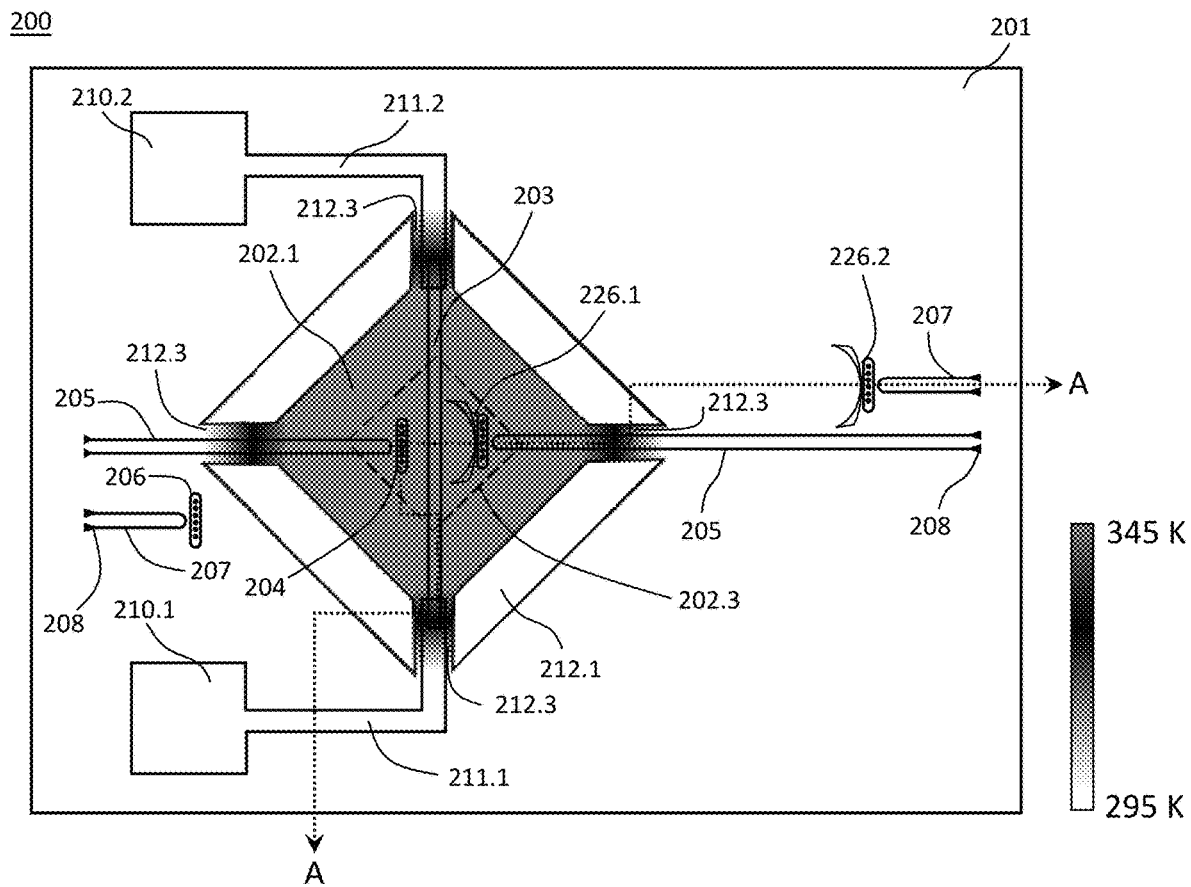
FIG. 5A shows a configuration for a photonic ac-dc voltage and current equivalence converter, according to some embodiments.
Figure 5B:
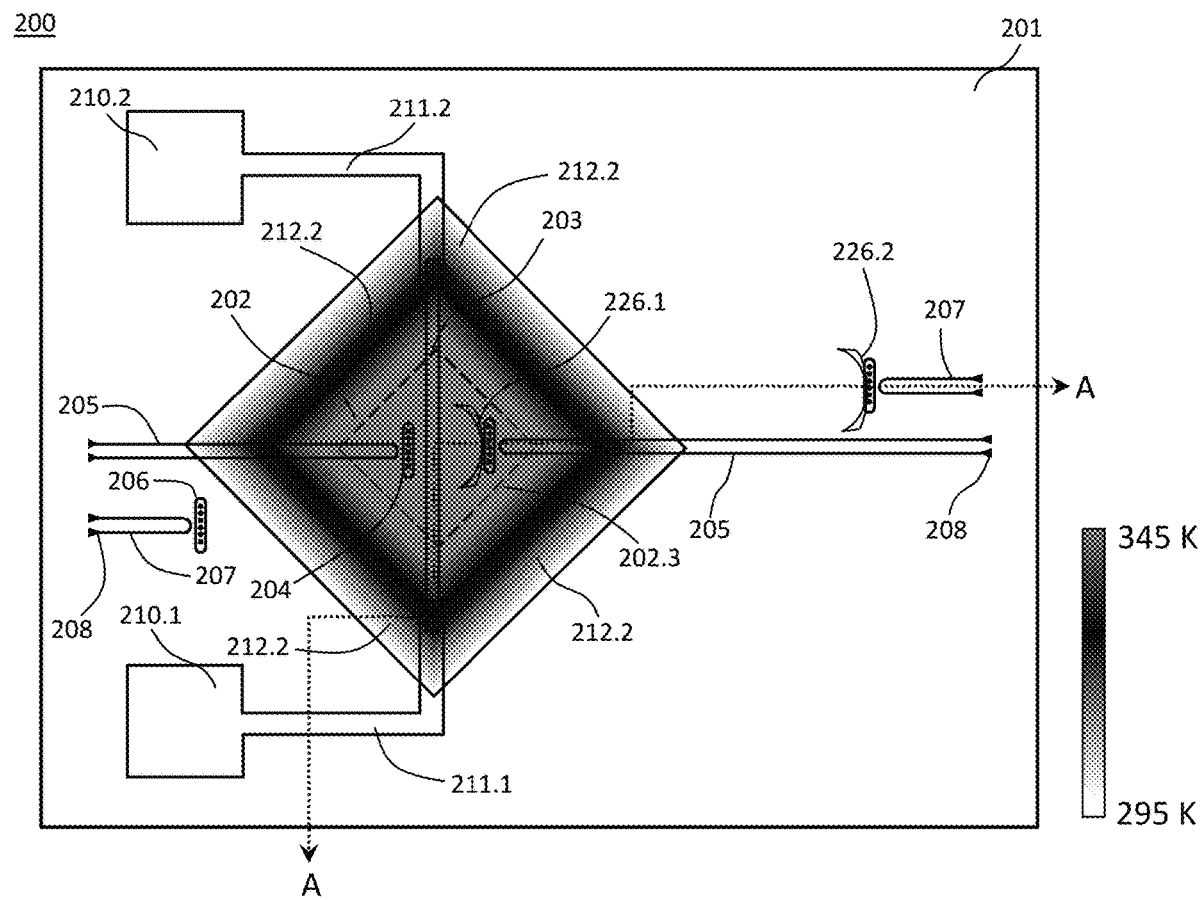
FIG. 5B shows a configuration for a photonic ac-dc voltage and current equivalence converter, according to some embodiments.
Figure 5C:
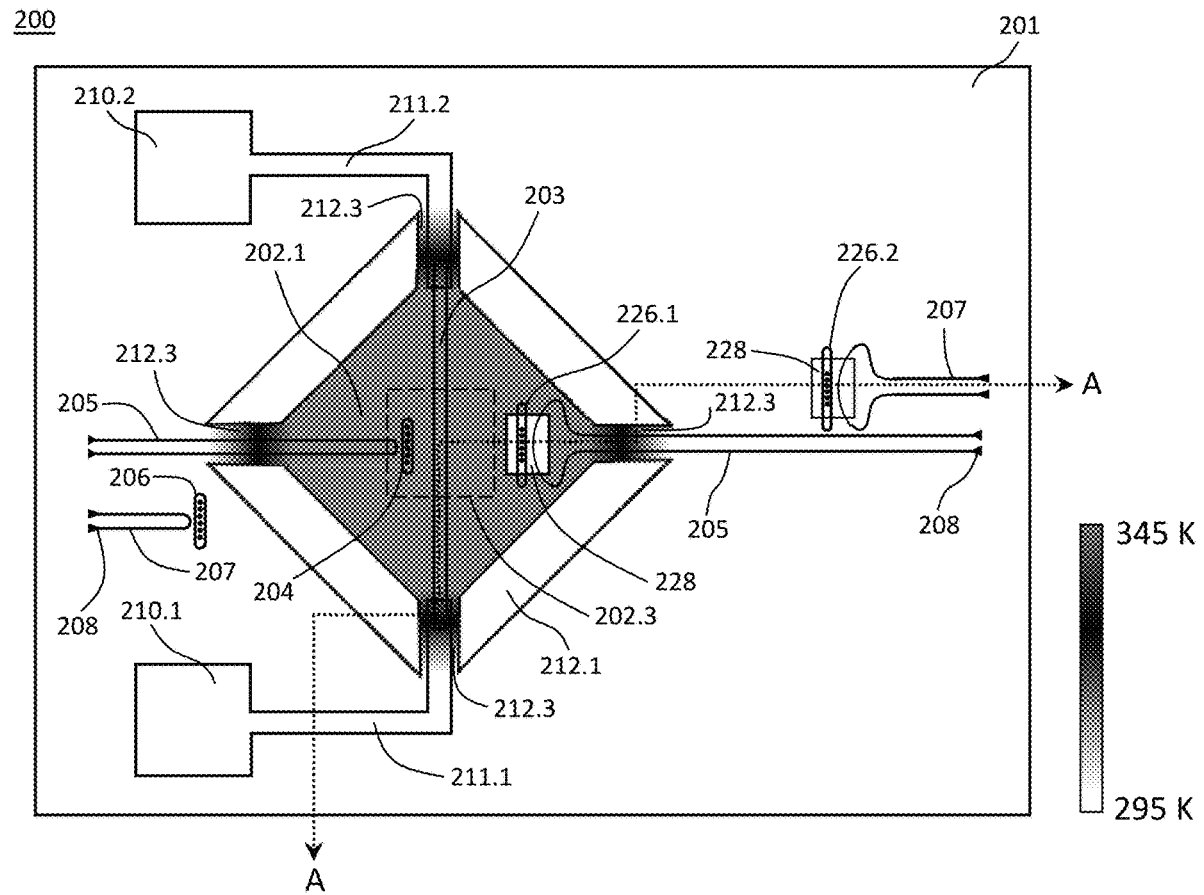
FIG. 5C shows a configuration for a photonic ac-dc voltage and current equivalence converter, according to some embodiments.
Figure 5D:
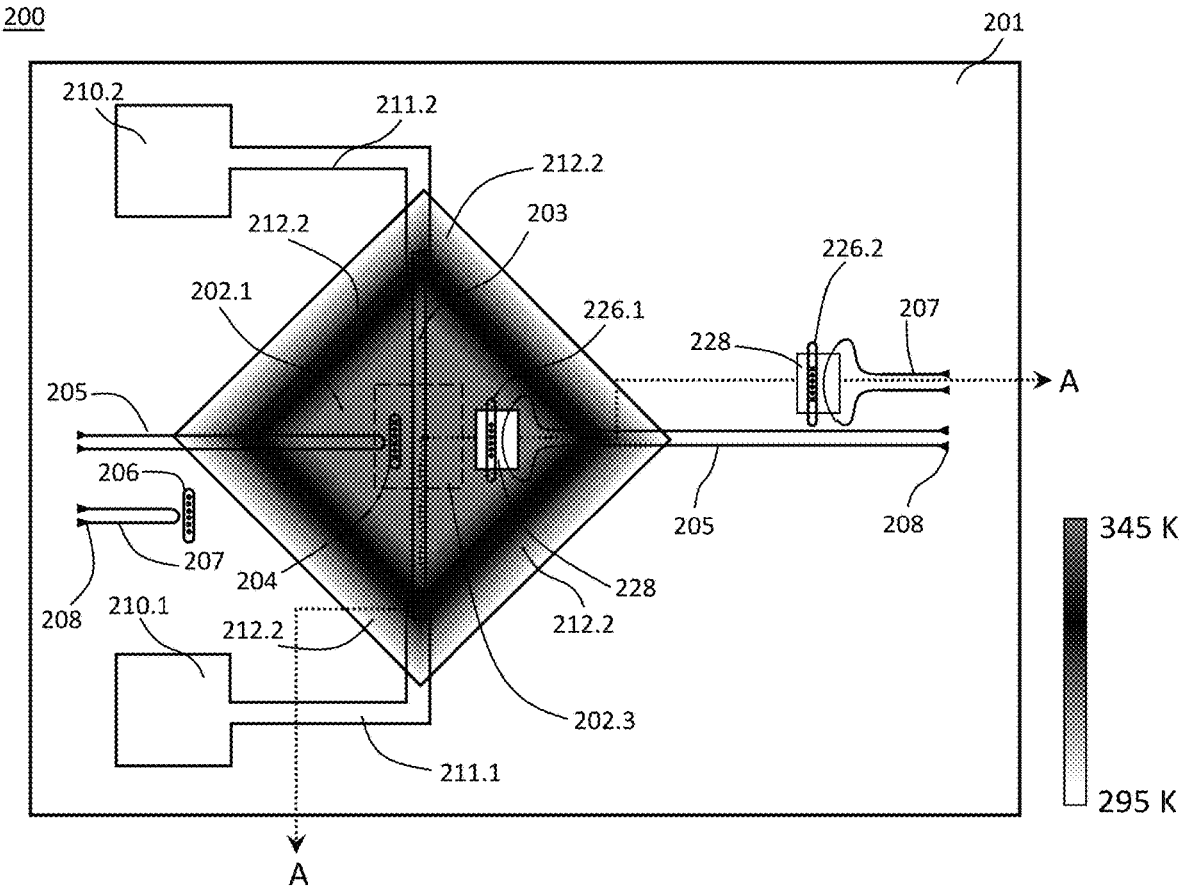
FIG. 5D shows a configuration for a photonic ac-dc voltage and current equivalence converter, according to some embodiments.
Figure 6A:
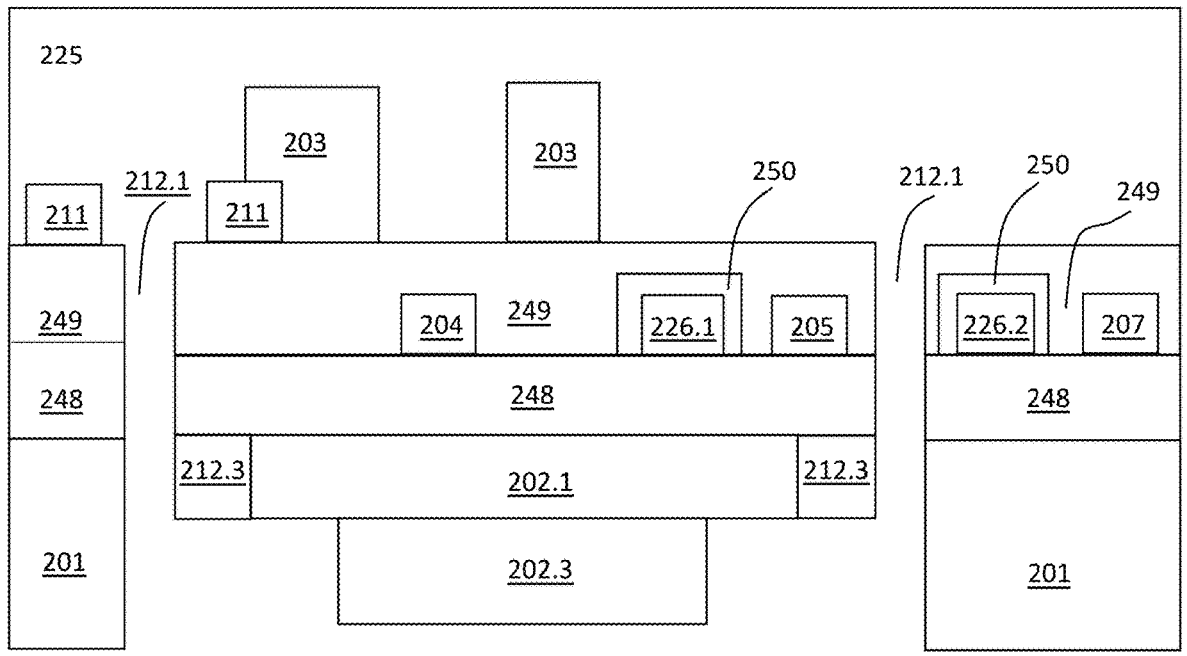
FIG. 6A shows a cross-section along line A-A of the photonic ac-dc voltage and current equivalence converter shown in FIG. 5A, according to some embodiments.
Figure 6B:
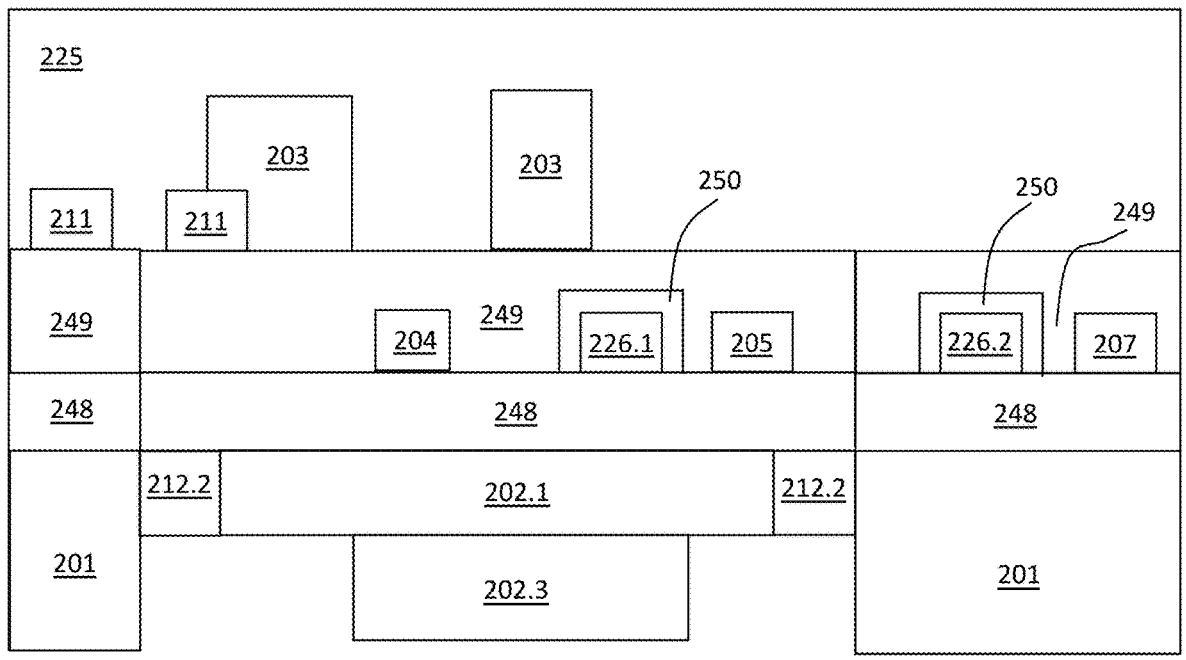
FIG. 6B shows a cross-section along line A-A of the photonic ac-dc voltage and current equivalence converter shown in FIG. 5B, according to some embodiments.
Figure 6C:
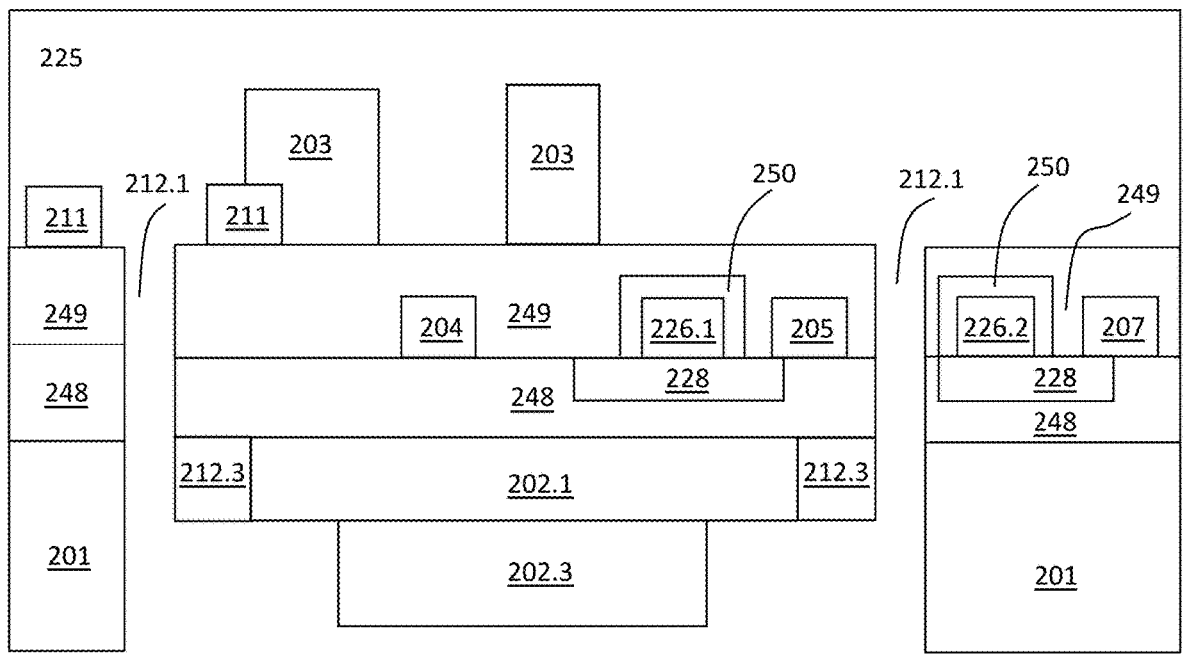
FIG. 6C shows a cross-section along line A-A of the photonic ac-dc voltage and current equivalence converter shown in FIG. 5C, according to some embodiments.
Figure 6D:
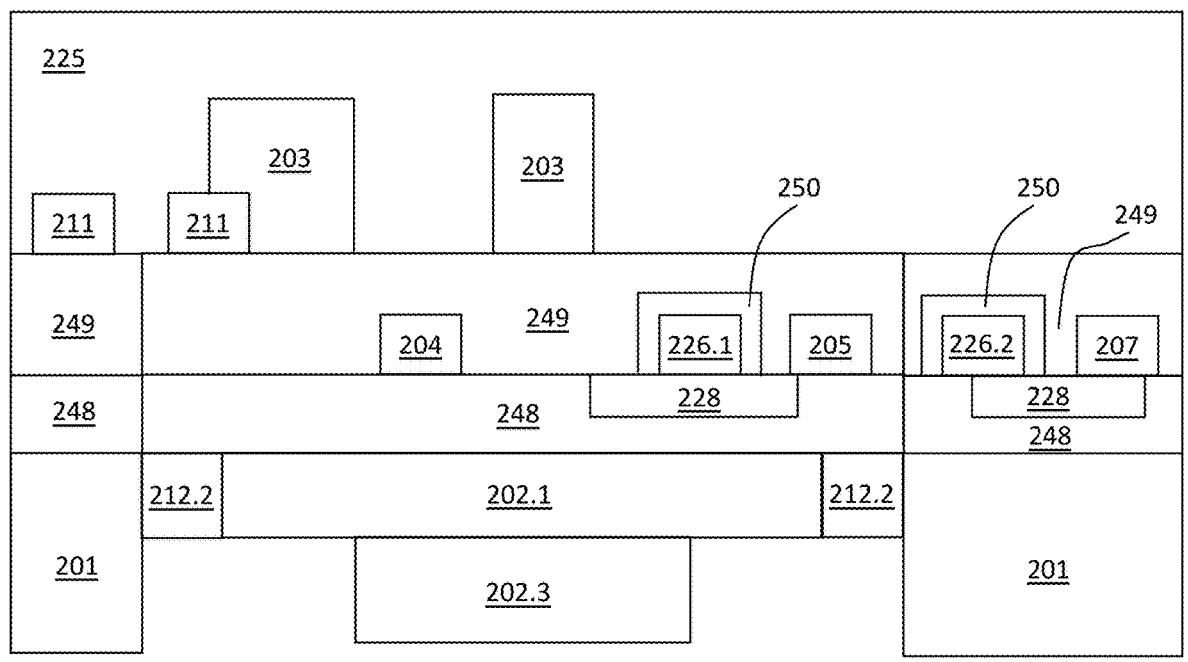
FIG. 6D shows a cross-section along line A-A of the photonic ac-dc voltage and current equivalence converter shown in FIG. 5D, according to some embodiments.

Resistive electrode 203 has a temperature that depends on an amount of electrical current communicated though resistive electrode 203. As shown in FIG. 1, resistive electrode 203 can be in electrical communication with bonding pad 210 that is electrically conductive (e.g., made of conductive metal or doped material (e.g., indium tin oxide)) so that dc voltage source 214 or ac voltage source 215 can be applied at bonding pad 210 (210.1, 210.2) to cause a potential difference across resistive electrode 203. Joule heating of resistive electrode 203 increases as the electrical current through resistive electrode 203 increases. Various high resistivity materials can be used for high resistivity electrode 203, including a metal alloy. Exemplary metals for the metal alloy include nickel, chromium, aluminum, and copper. In an embodiment, high resistivity electrode 203 is $Ni_{75}Cr_{20}Al_{2.5}Cu_{2.5}$.

Isolation trench 212.1 can be a gap between isothermal region 202 and photonic chip 201 that is empty (e.g., an air gap) or filled with a thermally insulating material so that isothermal region 202 is thermally isolated from photonic chip 201. Accordingly, when isothermal region 202 is heated due to electrical current causing Joule heating of resistive electrode 203, even though isothermal region 202 is heated, photonic chip 201 maintains its temperature without a temperature increase or having an insignificant increase in temperature, e.g., that does not appreciably shift the resonance of chip photonic nanoresonator 206.

Isothermal region temperature probe light 219 and chip temperature probe light 220 can be selected to match resonance conditions respectively of isothermal region photonic nanoresonator 204 and chip photonic nanoresonator 206. The isothermal region probe light source 216 and chip probe light source 221 can provide isothermal region temperature probe light 219 and chip temperature probe light 220. The light source can be a laser with light (219, 220) propagating through free space or in a condensed medium such as an optical fiber. The wavelength of the light can be, e.g., a visible wavelength or infrared light.

Figure 12:
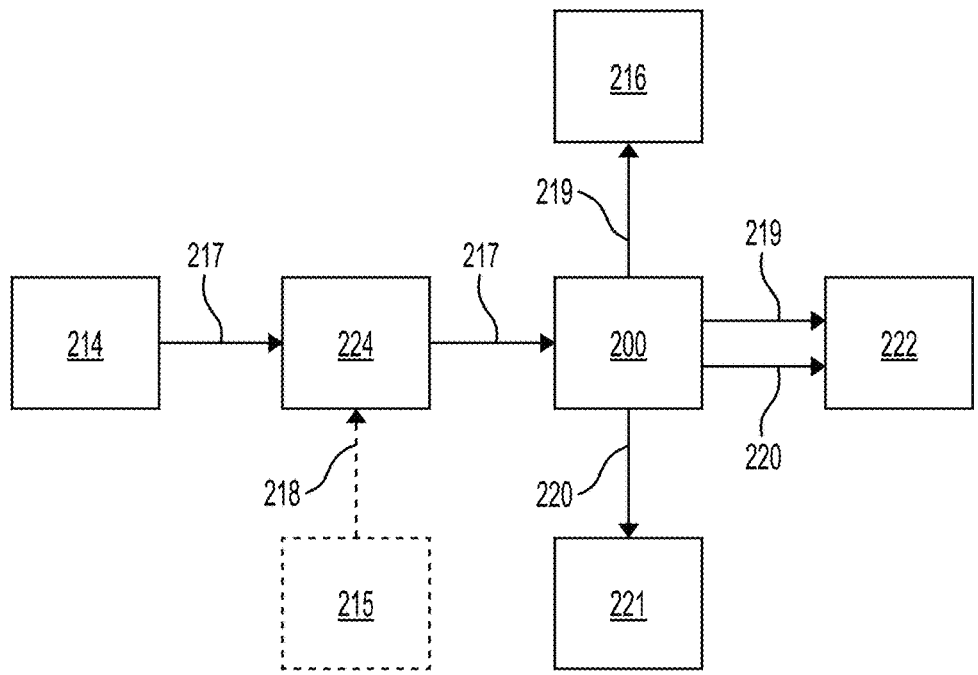
FIG. 12 shows a photonic ac-dc voltage and current equivalence converter with dc voltage heating a resistive electrode in panel A and an ac voltage heating the resistive electrode in panel B, according to some embodiments.
Figure 12:
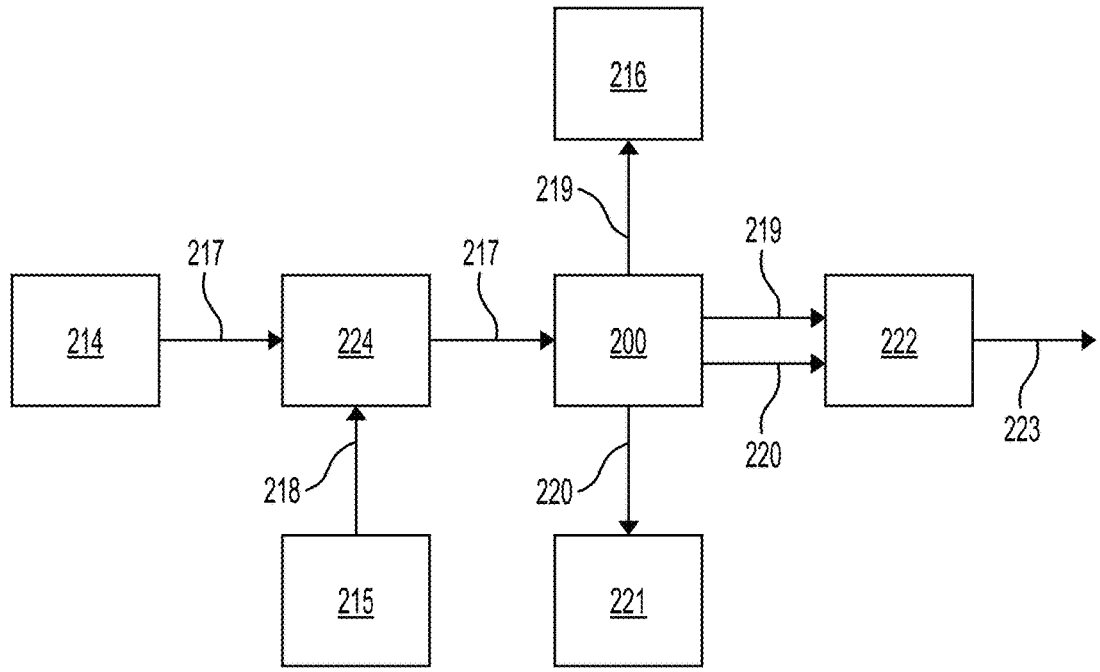

With reference to FIG. 12, analyzer 222 can receive isothermal region temperature probe light 219 and chip temperature probe light 220 and produce voltage determination 223 based on analysis of isothermal region temperature probe light 219 and chip temperature probe light 220. In an embodiment, analyzer 222 includes a photodiode that receives isothermal region temperature probe light 219 and chip temperature probe light 220 and produces an electrical signal that includes a beat frequency produced by isothermal region temperature probe light 219 and chip temperature probe light 220 incident on the photodiode. The electrical signal is subject to waveform analysis to convert the time-domain data into the frequency domain to obtain the beat frequency, which is then used to recover the temperature increase of isothermal region 202. Accordingly, voltage determination 223 represents the equivalence conversion between ac voltage 218 and dc voltage 217 applied across resistive electrode 203 that gave rise, respectively, to test elevated temperature and primary elevated temperature. It is contemplated that analyzer 222 includes a general purpose or special purpose computer for performing numerical analysis, modeling, fitting, instructions, or steps in a script or computer program for performing ac-dc voltage and current equivalence conversion using the beat frequency.

In an aspect, the photonic temperature sensor (e.g., isothermal region photonic nanoresonator 204) includes a photonic device (such as a photonic crystal cavity or whispering gallery mode micro-resonator) with a property (such as resonant frequency) that is sensitive to temperature. The temperature rise sensed by a photonic temperature sensor is determined using frequency metrology. The photonic temperature sensor is encapsulated, shielding it from the environment effects such as humidity. Moreover, the primary photonic temperature standard can include an optomechanical device (such as a suspended nanobeam photonic crystal cavity, and/or fin-based optomechanical device), wherein the averaged mean square amplitude of the device's mechanical oscillations can be directly related to thermodynamic temperature. The photonic temperature sensor or standard can be fabricated from silicon, silicon nitride (silicon- or silicon nitride-on-insulator platform), AlN, $TiO_2$, GaAs, or other semiconductive materials. The photonic temperature sensor and photonic primary quantum temperature standard can be referred as a photonic thermometer.

Resistive electrode 203 includes a high resistivity and very low temperature coefficient of resistance. The resistive electrode can be fabricated from metal alloy such as $Ni_{75}Cr_{20}Al_{2.5}Cu_{2.5}$ alloy. The first photonic thermometer can be disposed adjacent to resistive electrode 203 and used for measuring Joule heating; the second photonic thermometer can be disposed distal to resistive electrode 203 to measure the temperature of photonic chip 201 or the temperature of the environment in which photonic ac-dc voltage equivalence converter 200 is disposed. Moreover, resistive electrode 203 and the adjacent photonic thermometer have a strong thermal link between each other but have a very weak thermal link to the bulk of photonic chip 201 and the second photonic thermometer. Weak thermal link 212 comprising of all or a combination of the following components: isolation trench 212.1, isolation membrane 212.2, isolation tether 212.3; where isolation trench 212.1 is interposed between isothermal region 202 and isothermal region 202, such that isothermal region 202 is thermally isolated from photonic chip 201; isolation tether 212.3 is a narrow, bridge-type-structure, one end of which is disposed on chip 201 and the opposite end is disposed on isothermal region 202, isolation tether 212.3 allows weak thermal link between isothermal region 202 and chip 201, as well a mechanical suspension of isothermal region 202 from photonic chip 201; isolation membrane 212.2 disposed on isothermal region 202 and chip 201 and provide weak thermal link between isothermal region 202 and chip 201; This weak thermal link can be in the form of a isothermal region that supports the suspended resistive electrode 203 that, in turn, supports resistive electrode 203 and the photonic thermometer. The weak thermal link 212 and the isothermal region 202 support resistive electrode 203, and the photonic thermometer. The isolation trenches 212.1 can be etched partially or completely, surrounding high resistivity electrode 203 and the adjacent photonic thermometer. The photonic thermometer distal to high resistivity electrode 203 is thermally coupled to the bulk of photonic chip 201.

Photonic ac-dc voltage equivalence converter 200 can be made of various elements and components that are microfabricated, microfabricated or nanofabricated. Elements of photonic ac-dc voltage equivalence converter 200 can be various sizes and can be made of a material that is physically or chemically resilient in an environment in which photonic ac-dc voltage equivalence converter 200 is disposed. Exemplary materials include a metal, ceramic, thermoplastic, glass, semiconductor, and the like. Some of the elements of photonic ac-dc voltage equivalence converter 200 can be made of the same or different material and can be monolithic in a single physical body or can be separate members that are phsycially joined.

Photonic ac-dc voltage equivalence converter 200 can be made in various ways. It should be appreciated that photonic ac-dc voltage equivalence converter 200 includes a number of optical, electrical, or mechanical components, wherein such components can be interconnected and placed in communication (e.g., optical communication, electrical communication, mechanical communication, and the like) by physical, chemical, optical, or free-space interconnects. The components can be disposed on mounts that can be disposed on a bulkhead for alignment or physical compartmentalization. As a result, photonic ac-dc voltage and current equivalence converter 200 can be disposed in a terrestrial environment or space environment. Elements of photonic ac-dc voltage and current equivalence converter 200 can be formed from silicon, silicon nitride, and the like although other suitable materials, such ceramic, glass, or metal can be used. According to an embodiment, the elements of photonic ac-dc voltage and current equivalence converter 200 are formed using 3D printing although the elements of photonic ac-dc voltage and current equivalence converter 200 can be formed using other methods, such as injection molding or machining a stock material such as block of material that is subjected to removal of material such as by cutting, laser oblation, chemical vapor deposition, etching, and the like. Accordingly, photonic ac-dc voltage and current equivalence converter 200 can be made by additive or subtractive manufacturing. In an embodiment, elements of photonic ac-dc voltage and current equivalence converter 200 are selectively etched to remove various different materials using different etchants and photolithographic masks and procedures. The various layers thus formed can be subjected to joining by bonding to form photonic ac-dc voltage and current equivalence converter 200.

The process for making photonic ac-dc voltage and current equivalence converter 200 also can include fabrication of photonic nanoresonators 204 and 206, photonic quantum temperature standard 226; this fabrication process includes spin-coating of photonic materials such as Si, SiN, GaAs, SiC, $TiO_2$, AlN or other semiconductor materials with organic or non-organic photoresist materials for etch mask, lithographic patterning deposited photoresist to transfer the photonic structure into resist, followed by anisotropic reactive ion etch of photoresist-based mask; photonic structure can be encapsulated with dielectric material such as spin-on-glass, SiO2, Al2O3, or other dielectrics materials. The process for making photonic ac-dc voltage and current equivalence converter 200 also can include the deposition and photolithographic patterning of various materials, including $Ni_{75}Cr_{20}Al_{2.5}Cu_{2.5}$ alloy and $Cu_{86}Mn_{12}Ni_2$ alloy, forming the high resistivity electrode 203, the deposition and photolithographic patterning of various materials, including Cr, Ti, Ni, Cu, Ag, Au, Pd, Pt, and other conductive metals, forming the bonding pads 210 (210.1, 210.2), and photolithographic patterning and removal of various materials from the backside of photonic chip using different etchants and photolithographic masks and procedures to form a weak thermal link between the high resistivity electrode 203 and the adjacent photonic thermometer that can be in the form of a isothermal region 202 that supports resistive electrode 203 and the photonic thermometer, tethers 212.2 that support isothermal region 202 (when it is suspended from chip 201), which, in turn, supports resistive electrode 203 the photonic thermometer, or isolation trenches 212.1 (e.g., etched partially or completely) surrounding resistive electrode 203 and the adjacent photonic thermometer.

Photonic ac-dc voltage and current equivalence converter 200 has numerous advantageous and unexpected benefits and uses. In an embodiment, a process for performing ac-dc voltage equivalence conversion with photonic ac-dc voltage equivalence converter 200 includes: applying dc voltage 217 across resistive electrode 203; measuring, with isothermal region photonic nanoresonator 204, the temperature of resistive electrode 203; measuring, with chip photonic nanoresonator 206, the temperature of photonic chip 201; determining the dc Joule heating of resistive electrode 203 relative to chip temperature by measuring the frequency beating of isothermal region temperature probe light 219 from isothermal region photonic nanoresonator 204 and chip temperature probe light 220 from chip photonic nanoresonator 206; applying a varied ac voltage 218 across resistive electrode 203; measuring, with isothermal region photonic nanoresonator 204, the ac Joule heating from applying the varied ac voltage 218 across resistive electrode 203; and matching the ac Joule heating to the dc Joule heating to perform ac-dc voltage equivalence conversion.

In an embodiment, applying dc voltage 217 across resistive electrode 203 occurs by supplying a known dc voltage 217 with positive polarity from a stable voltage source to the resistive electrode 203, with the high and low terminals of the voltage source connected to bonding pads 210 (210.1 and 210.2), for a time sufficient for the temperature of resistive electrode 203 to stabilize and by supplying a known dc voltage 217 with negative polarity from a stable voltage source to the resistive electrode 203, with the high and low terminals of the voltage source connected to bonding pads 210 (210.1 and 210.2), for a time sufficient for the temperature of the resistive electrode 203 to stabilize. According to an embodiment, measuring, with isothermal region photonic nanoresonator 204, the temperature of isothermal region 202 and the temperature of resistive electrode 203 occurs by applying isothermal region temperature probe light 219 from isothermal region probe light source 216 to isothermal region photonic nanoresonator 204. After passing through isothermal region photonic resonator 204, the isothermal region temperature probe light 219 is applied to the isothermal region photodetector 239. The isothermal region photodetector output signal 235 is applied to PID controller 233.1, interposed between isothermal region probe light source 216 and isothermal region photodetector 239. The PID controller 233.1 provides PID output signal 238.1 to isothermal region light source 216 to keep light source frequency to be equal to first photonic resonance frequency 241. First photonic resonance frequency 241 can be obtained by routing isothermal region temperature probe light 219 to wavemeter 232 via optical splitter 234.1 and optical switch 231, both interposed between isothermal region light source 216 and wavemeter 232. The measured first photonic resonance frequency 241 is converted to first photonic resonance temperature 244 using temperature converter 243 by applying calibration curve of isothermal region photonic nanoresonator 204. According to an embodiment, measuring, with chip photonic nanoresonator 206, the temperature of photonic chip 201 occurs by applying chip temperature probe light 220 from chip probe light source 221 to chip photonic nanoresonator 206. After passing through chip photonic resonator 206, chip temperature probe light 220 is applied to chip photodetector 240. The chip photodetector output signal 236 is applied to PID controller 233.2, interposed between chip probe light source 221 and chip photodetector 240. The PID controller 233.2 provides PID output signal 238.2 to chip probe light source 221 to keep chip probe light source frequency to be equal to second photonic resonance frequency 242. Second photonic resonance frequency 242 can be obtained by routing chip temperature probe light 220 to wavemeter 232 via optical splitter 234.2 and optical switch 231, both interposed between chip temperature probe light source 221 and wavemeter 232. The measured second photonic resonance frequency 242 is converted to second photonic resonance temperature 245 using temperature converter 243 by applying calibration curve of chip photonic nanoresonator 206. In another embodiment, the difference between first photonic resonance frequency 241 and second photonic resonance frequency 242 can be measured by combining isothermal region temperature probe light 219 and chip temperature probe light 220 using optical splitter 234.3. The combined light 247, when sent to combined light photodetector 246, produce a beating pattern in the output signal. The difference between first photonic resonance frequency 241 and second photonic resonance frequency 242 is obtained by counting beat frequency on frequency counter 236. The obtained frequency difference is converted to temperature difference between first photonic resonance temperature 244 and second photonic resonance temperature 245 using temperature converter 243 by applying calibration curves of isothermal region photonic nanoresonator 204 and chip nanoresonator 206. According to an embodiment, determining the dc Joule heating of resistive electrode 203 relative to chip temperature is obtain by taking the difference between first photonic resonance temperature 244 and second photonic resonance temperature 245. According to an embodiment, applying a varied ac voltage 218 across resistive electrode 203 occurs by supplying a varied ac voltage 218 with from an ac voltage source, arbitrary waveform generator, or pattern generator for a time sufficient for the temperature of the high resistivity electrode 203 to stabilize. According to an embodiment, measuring, with isothermal region photonic nanoresonator 204, the ac Joule heating from applying the varied ac voltage 218 across high resistivity electrode 203 occurs by measuring the difference between first photonic resonance temperature 244 and second photonic resonance temperature 245. According to embodiment, the procedure of measuring such temperature difference is equivalent to the procedure of measuring the difference between first photonic resonance temperature 244 and second photonic resonance temperature 245 when dc voltage is applied. According to an embodiment, matching the ac Joule heating to the dc Joule heating to perform ac-dc voltage equivalence conversion is accomplished by adjusting the rms amplitude of the ac voltage 218 supplied by the ac voltage source, arbitrary waveform generator, or pattern generator to the resistive electrode 203, with the high and low terminals of the voltage source connected to bonding pads 210 (210.1 and 210.2), so that the ac joule heating of resistive electrode 203 determined from the difference between first photonic resonance temperature 244 and second photonic resonance temperature 245, when the dc voltage is supplied to the resistive electrode 203, matches the dc joule heating determined from the difference between first photonic resonance temperature 244 and second photonic resonance temperature 245, when the ac voltage is supplied to the resistive electrode 203, with the high and low terminals of the voltage source connected to bonding pads 210 (210.1 and 210.2).

In another embodiment, the temperature difference between first photonic resonance frequency 241 and second photonic resonance frequency 242, or equivalently the difference between temperature of isothermal region 202 and temperature of photonic chip 201 can we measure as follows. Optical splitter 234.1 divides light from isothermal region light source 216 into isothermal region temperature probe light 219 and chip temperature probe light 220. After passing through chip photonic resonator 206, chip temperature probe light 220 is applied to chip photodetector 240. The chip photodetector output signal 236 is applied to PID controller 233.2, interposed between light source 216 and chip photodetector 240. The PID controller 233.2 provides PID output signal 238.2 to light source 216 to keep the light source frequency to be equal to second photonic resonance frequency 242. Isothermal region temperature probe light 219 passes through frequency modulator 251, which shifts the frequency of isothermal region temperature probe light 219 according to RF drive signal 252 supplied by frequency synthesizer 253. Isothermal region temperature probe light 219 then passes through isothermal region photonic resonator 204 and is applied to the isothermal region photodetector 239. The isothermal region photodetector output signal 235 is applied to PID controller 233.1, interposed between frequency synthesizer 253 and isothermal region photodetector 239. The PID controller 233.1 provides PID output signal 238.1 to frequency synthesizer 253, which adjusts the frequency of RF drive signal 252 to keep the frequency of isothermal region temperature probe light 219 to be equal to first photonic resonance frequency 241. Frequency synthesizer 253 also sends RF drive signal 252 to frequency counter 254. The difference between first photonic resonance frequency 241 and second photonic resonance frequency 242 is obtained by counting the frequency of RF drive signal 252 on frequency counter 254. The obtained frequency difference is converted to temperature difference between first photonic resonance temperature 244 and second photonic resonance temperature 245 using temperature converter 243 by applying calibration curves of the isothermal region photonic nanoresonator 204 and chip nanoresonator 206.

According to embodiment, the temperature difference between first photonic resonance frequency 241 and second photonic resonance frequency 242, can be measure as follows isothermal region temperature probe light 219 from isothermal region light source 216 passes through both chip photonic nanoresonator 206 and isothermal region photonic resonator 204. The frequency of light source 216 is swept through a range encompassing first photonic resonance frequency 241 and second photonic resonance frequency 242. After passing through both photonic resonators, temperature probe light 219 is applied to photodetector 239. The photodetector output signal 235 is applied to signal analyzer 255, which records the time delay 256 between the time that the frequency of light source 216 matches first photonic resonance frequency 241 and the time that the frequency of light source 216 matches second photonic resonance frequency 242. Delay 256 is converted to the difference between first photonic resonance frequency 241 and second photonic resonance frequency 242 by routing temperature probe light 219 to wavemeter 232 via optical splitter 234.1, which calibrates the frequency sweep rate of light source 216. The obtained frequency difference is converted to temperature difference between first photonic resonance temperature 244 and second photonic resonance temperature 245 using temperature converter 243 by applying calibration curves of the isothermal region photonic nanoresonator 204 and chip nanoresonator 206.

Advantageously, photonic ac-dc voltage and current equivalence converter 200 overcomes limitations and technical deficiencies of conventional devices and conventional processes that are used to determine ac voltages and ac currents from dc voltages and dc currents or for calibration of electrical instrumentation. ac-dc difference is a key measurement that links ac and RF measurements to quantum realizations of SI units. Photonic ac-dc voltage and current equivalence converter 200 provides accurate measurements of ac-dc difference that is useful in various settings, including the computer electronics and information technology industries, and the electric power and utility industries, military, and scientific research. Conventional technologies are not as robust as performing ac-dc voltage and current equivalence conversion described herein and may not provide a method for internal calibration. Accordingly, photonic ac-dc voltage and current equivalence converter 200 can provide higher precision and accuracy for high-value applications than conventional devices.

In this manner, photonic ac-dc voltage and current equivalence converter 200 can be a chip-scale photonic device that incorporates a thin-film resistive electrode, a pair of photonic temperature sensors, or a pair of photonic quantum temperature standards. Photonic ac-dc voltage and current equivalence converter 200 can be used as a photonics-based ac-dc equivalence thermal converter by measuring a local temperature rise as sensed by the photonic sensor or photonic quantum standard due to Joule heating in the resistive electrode upon applying a selected dc voltage or dc current to the terminals of resistive electrode 203. The equivalent ac voltage or ac current can be determined by matching the temperature rise in the resistive electrode when ac voltage or ac current is applied to its terminals as above-describe.

Photonic ac-dc voltage and current equivalence converter 200 and processes herein unexpectedly advance the measurement and metrology of ac electrical waveform rms amplitude through the superior performance of photonic temperature sensors compared to thermocouples and thermoresistive sensors in both temperature resolution and reproducibility. Furthermore, unlike a metal thermocouple array or thermoresistive sensor, the waveguide-integrated photonic thermometer does not capacitively couple to the resistive heater element, sharply reducing the frequency dependence on Joule heating, reducing the difference in the measured rise in temperature between a dc signal and an ac signal. Unlike these processes, the photonic ac-dc voltage and current equivalence converter 200 uses photonic sensors or photonic quantum standards to measure local temperature rise upon applying a selected ac or dc voltage or current to the terminals of resistive electrode 203. This requires changes in device fabrication and temperature measurements from both thermocouple array- and thermoresistive sensor-based ac-dc voltage and current equivalence converter measurements.

The processes described herein may be embodied in, and fully automated via, software code modules executed by a computing system that includes one or more general purpose computers or processors. The code modules may be stored in any type of non-transitory computer-readable medium or other computer storage device. Some or all the methods may alternatively be embodied in specialized computer hardware. In addition, the components referred to herein may be implemented in hardware, software, firmware, or a combination thereof.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

Any logical blocks, modules, and algorithm elements described or used in connection with the embodiments disclosed herein can be implemented as electronic hardware, computer software, or combinations of both. To clearly illustrate this interchangeability of hardware and software, various illustrative components, blocks, modules, and elements have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described or used in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration.

Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix (s) as used herein is intended to include both the singular and the plural of the term that it modifies, thereby including at least one of that term (e.g., the colorant(s) includes at least one colorants). Option, optional, or optionally means that the subsequently described event or circumstance can or cannot occur, and that the description includes instances where the event occurs and instances where it does not. As used herein, combination is inclusive of blends, mixtures, alloys, reaction products, collection of elements, and the like.

As used herein, a combination thereof refers to a combination comprising at least one of the named constituents, components, compounds, or elements, optionally together with one or more of the same class of constituents, components, compounds, or elements.

All references are incorporated herein by reference.

The use of the terms "a," "an," and "the" and similar referents in the context of describing the invention (especially in the context of the following claims) are to be construed to cover both the singular and the plural, unless otherwise indicated herein or clearly contradicted by context. It can further be noted that the terms first, second, primary, secondary, and the like herein do not denote any order, quantity, or importance, but rather are used to distinguish one element from another. It will also be understood that, although the terms first, second, etc. are, in some instances, used herein to describe various elements, these elements should not be limited by these terms. For example, a first current could be termed a second current, and, similarly, a second current could be termed a first current, without departing from the scope of the various described embodiments. The first current and the second current are both currents, but they are not the same condition unless explicitly stated as such.

The modifier about used in connection with a quantity is inclusive of the stated value and has the meaning dictated by the context (e.g., it includes the degree of error associated with measurement of the particular quantity). The conjunction or is used to link objects of a list or alternatives and is not disjunctive; rather the elements can be used separately or can be combined together under appropriate circumstances.

What is claimed is:

1. A photonic ac-dc voltage and current equivalence converter for performing ac-dc voltage and current equivalence conversion, the photonic ac-dc voltage and current equivalence converter comprising:
    a photonic chip;
    a weak thermal link disposed on and in mechanical communication with the photonic chip;
    a isothermal region disposed on the weak thermal link an in mechanical communication with the weak thermal link, the isothermal region comprising: an isothermal substrate, an isothermal membrane, an isothermal obelisk disposed on either isothermal substrate, or on the isothermal membrane;
    when isothermal region comprised of isothermal membrane, the weak thermal link mechanically suspends the isothermal region from the photonic chip;
    the weak thermal link comprised of the following elements interposed between the isothermal region and the photonic chip: isolation trenches, an isolation membrane, isolation tether;
    an weak thermal link interposed between the isothermal region and the photonic chip, such that the isothermal region is thermally isolated from the photonic chip;
    a resistive electrode disposed on the isothermal region and in thermal communication with the isothermal region and that receives dc voltage, resistively heats to a primary elevated temperature in response to the dc voltage, receives ac voltage non-contemporaneously with the dc voltage, resistively heats to a test elevated temperature in response to the ac voltage, and heats the isothermal region via heat transfer from the resistive electrode to the isothermal region based on the primary elevated temperature and the test elevated temperature of the high resistivity electrode;
    an isothermal region photonic nanoresonator disposed on the isothermal region and comprising a first photonic resonance from which a temperature of the isothermal region is determinable and that varies with temperature of the isothermal region and that receives an isothermal region temperature probe light from an isothermal region waveguide;
    the isothermal region waveguide disposed on the isothermal region in optical communication with the isothermal region photonic nanoresonator and that communicates the isothermal region temperature probe light to the isothermal region photonic nanoresonator and that monitors transmission and storage of the isothermal region temperature probe light by the isothermal region photonic nanoresonator to determine the temperature of the isothermal region;
    a chip photonic nanoresonator disposed on the photonic chip and in thermal communication with the photonic chip and comprising a second photonic resonance from which a temperature of the photonic chip is determinable and that varies with temperature of the photonic chip and that receives a chip temperature probe light from a chip waveguide; and
    the chip waveguide disposed on the photonic chip in optical communication with the chip photonic nanoresonator and that communicates the chip temperature probe light to the chip photonic nanoresonator and that monitors transmission and storage of the chip temperature probe light by the chip photonic nanoresonator to determine the temperature of the isothermal region, such that the ac voltage is determined from matching a temperature rise of the isothermal region due to the primary elevated temperature of the isothermal region when the ac voltage is received by the resistive electrode.

2. The photonic ac-dc voltage and current equivalence converter of claim 1, further comprising an encapsulation medium disposed on the isothermal region, the isothermal region photonic nanoresonator, and the chip photonic nanoresonator to shield the isothermal region photonic nanoresonator and the chip photonic nanoresonator from perturbation by an environmental effect comprising humidity or moisture.

3. The photonic ac-dc voltage and current equivalence converter of claim 1, wherein the photonic chip, the isothermal region, and the weak thermal link independently comprise a semiconductive material.

4. The photonic ac-dc voltage and current equivalence converter of claim 1, wherein the isothermal region photonic nanoresonator and the chip photonic nanoresonator independently comprise a photonic crystal cavity or a whispering gallery mode micro-resonator.

5. The photonic ac-dc voltage and current equivalence converter of claim 1, further comprising a primary photonic quantum temperature standard disposed on the photonic chip.

6. The photonic ac-dc voltage and current equivalence converter of claim 5, wherein the primary photonic quantum temperature standard comprises a suspended nanobeam photonic crystal cavity or a fin-based optomechanical device, such that and averaged mean square amplitude of the thermally driven mechanical oscillations of the primary photonic quantum temperature standard is directly related to thermodynamic temperature.

7. The photonic ac-dc voltage and current equivalence converter of claim 5, wherein the primary photonic quantum temperature standard comprises a semiconductive material.

8. The photonic ac-dc voltage and current equivalence converter of claim 1, wherein the isothermal region photonic nanoresonator and the chip photonic nanoresonator independently comprise a photonic crystal cavity, a whispering gallery mode micro-resonator, primary photonic temperature standard.

9. The photonic ac-dc voltage and current equivalence converter of claim 1, wherein the isothermal region photonic nanoresonator and the chip photonic nanoresonator independently comprise a semiconductive material.

10. The photonic ac-dc voltage and current equivalence converter of claim 1, wherein the resistive electrode comprises a metal alloy.

11. The photonic ac-dc voltage and current equivalence converter of claim 1, wherein the metal alloy comprises nickel, chromium, aluminum, and copper.

12. A process for performing ac-dc voltage and current equivalence conversion with the photonic ac-dc voltage and current equivalence converter of claim 1, the process comprising:
applying a dc voltage across the resistive electrode;
determining the temperature difference between the temperature of isothermal region (resistive electrode) and the temperature of photonic chip;
determining the dc Joule heating of the resistive electrode relative to chip temperature by measuring the temperature difference between the temperature of isothermal region (resistive electrode) and the temperature of photonic chip;
applying a varied ac voltage across the high resistivity electrode;
applying the varied ac voltage across the high resistivity electrode and determining the ac Joule heating from measured temperature difference between the temperature of isothermal region (resistive electrode) and the temperature of photonic chip; and
matching the ac Joule heating to the dc Joule heating to perform ac-dc voltage equivalence conversion.

13. A photonic ac-dc voltage and current equivalence converter for performing ac-dc voltage equivalence conversion, the photonic ac-dc voltage equivalence converter comprising:
a photonic chip;
a weak thermal link disposed on and in mechanical communication with the photonic chip;
an isothermal region disposed on the weak thermal link an in mechanical communication with the weak thermal link;
an isothermal region can be comprised of the combination of the following elements: an isothermal substrate, an isothermal membrane, an isothermal obelisk disposed on either isothermal substrate, or on the isothermal membrane;
when isothermal region comprised of isothermal membrane, the weak thermal link mechanically suspends the isothermal region from the photonic chip;
the weak thermal link comprised of the following elements interposed between the isothermal region and the photonic chip: isolation trenches, an isolation membrane, isolation tether;
an weak thermal link interposed between the isothermal region and the photonic chip, such that the isothermal region is thermally isolated from the photonic chip;
a resistive electrode disposed on the isothermal region and in thermal communication with the isothermal region and that receives dc voltage, resistively heats to a primary elevated temperature in response to the dc voltage, receives ac voltage non-contemporaneously with the dc voltage, resistively heats to a test elevated temperature in response to the ac voltage, and heats the membrane via heat transfer from the high resistivity electrode to the membrane based on the primary elevated temperature and the test elevated temperature of the high resistivity electrode;
a first primary photonic quantum temperature standard disposed on the isothermal region and in mechanical communication with the isothermal region such that an averaged mean square amplitude of the thermally driven mechanical oscillations of the first primary photonic quantum temperature standard is directly related to the temperature of the isothermal region and from which the temperature of the isothermal region is determinable, wherein the amplitude varies with temperature of the isothermal region and is measured with isothermal region temperature probe light from the first primary photonic quantum temperature standard;
a second primary photonic quantum temperature standard disposed on the photonic chip and in thermal communication with the photonic chip such that an averaged mean square amplitude of the thermally driven mechanical oscillations of the second primary photonic quantum temperature standard is directly related to the temperature of the photonic chip and from which the temperature of the photonic chip is determinable, wherein the amplitude varies with temperature of the photonic chip and is measured with the second primary photonic quantum temperature standard, such that the ac voltage is determined from matching a temperature rise of the membrane due to the primary elevated temperature of the membrane when the ac voltage is received by the resistive electrode.

14. The photonic ac-dc voltage and current equivalence converter of claim 13, further comprising an isothermal region photonic nanoresonator and an isothermal region waveguide disposed on the isothermal region to measure the temperature of the isothermal region.

15. The photonic ac-dc voltage and current equivalence converter of claim 14, wherein the first primary photonic quantum temperature standard and the second primary photonic quantum temperature standard independently comprise a suspended nanobeam photonic crystal cavity or a fin-based optomechanical device.

16. The photonic ac-dc voltage and current equivalence converter of claim 13, further comprising a chip photonic nanoresonator and a chip waveguide disposed on the photonic chip to measure the temperature of the photonic chip.

17. A photonic ac-dc voltage and current equivalence converter for performing ac-dc voltage equivalence conversion, the photonic ac-dc voltage equivalence converter comprising:
a photonic chip;
a weak thermal link disposed on and in mechanical communication with the photonic chip;
an isothermal region disposed on the weak thermal link an in mechanical communication with the weak thermal link;
an isothermal region can be comprised of the combination of the following elements: an isothermal substrate, an isothermal membrane, an isothermal obelisk disposed on either isothermal substrate, or on the isothermal membrane;
when isothermal region comprised of isothermal membrane, the weak thermal link mechanically suspends the isothermal region from the photonic chip;
the weak thermal link comprised of the following elements interposed between the isothermal region and the photonic chip: isolation trenches, an isolation membrane, isolation tether;
an weak thermal link interposed between the isothermal region and the photonic chip, such that the isothermal region is thermally isolated from the photonic chip;
resistive electrode disposed on the isothermal region and in thermal communication with the isothermal region and that receives dc voltage, resistively heats to a primary elevated temperature in response to the dc voltage, receives ac voltage non-contemporaneously with the dc voltage, resistively heats to a test elevated temperature in response to the ac voltage, and heats the isothermal region via heat transfer from the high resistivity electrode to the isothermal region based on the primary elevated temperature and the test elevated temperature of the high resistivity electrode;

a first photonic temperature measurand comprising an isothermal region photonic nanoresonator or a first primary photonic quantum temperature standard and that is disposed on the isothermal region from which a temperature of the isothermal region is determinable; and a second photonic temperature measurand comprising a chip photonic nanoresonator or a second primary photonic quantum temperature standard and that is disposed on the photonic chip from which a temperature of the photonic chip is determinable, such that the ac voltage is determined from matching a temperature rise of the isothermal region due to the primary elevated temperature of the isothermal region when the ac voltage is received by the resistive electrode.

18. A process for determining the temperature difference between the temperature of an isothermal region and temperature of a photonic chip of a photonic ac-dc voltage and current equivalence converter, the process comprising:

measuring, with the isothermal region photonic nanoresonator, the temperature of the resistive electrode;

measuring, with the chip photonic nanoresonator, the temperature of the photonic chip; and taking a difference between measured isothermal region temperature and photonic chip temperature.

19. A method of determining the temperature difference between the temperature of isothermal region and the temperature of photonic chip, the process comprising:

applying isothermal region temperature probe light from isothermal region light source to isothermal region photonic nanoresonator and photonic chip nanoresonator connected in series or parallel and coupling the output light to the photodetector;

sweeping isothermal region probe light through a range of frequencies encompassing both the first and the second resonance frequencies;

applying photodetector output signal to signal analyzer and measure the time delay between the time that the frequency of isothermal region light source matches first photonic resonance frequency and the time that the frequency of isothermal region light source matches second photonic resonance frequency; and converting the measured time delay to the difference between the first and the second resonance frequencies.

20. A method of determining the temperature difference between the temperature of isothermal region and the temperature of photonic chip, the process comprising:

splitting the isothermal light source into isothermal region temperature probe light and chip temperature probe light;

measuring the temperature of photonic chip using the chip probe light;

using the frequency synthesizer and frequency modulator shift the frequency of the isothermal region temperature probe light to be equal to the first photonic resonance frequency;

using the frequency counter measure RF drive signal applied from frequency synthesizer to the frequency modulator; and deriving temperature difference from measured RF drive signal.

* * * * *